United States Patent
Haruta et al.

(10) Patent No.: US 9,843,690 B2
(45) Date of Patent: Dec. 12, 2017

(54) INFORMATION PROCESSING APPARATUS SWITCHING BETWEEN FIRST AND SECOND SCREENS AND INFORMATION PROCESSING METHOD THEREOF

(71) Applicant: FUJI XEROX CO., LTD., Tokyo (JP)

(72) Inventors: Takafumi Haruta, Kanagawa (JP); Shinichi Nakamura, Kanagawa (JP); Nozomi Noguchi, Kanagawa (JP); Ayaka Ishihara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/215,912

(22) Filed: Jul. 21, 2016

(65) Prior Publication Data

US 2017/0279985 A1  Sep. 28, 2017

(30) Foreign Application Priority Data

Mar. 22, 2016  (JP) ................. 2016-056736

(51) Int. Cl.
*G06F 3/12* (2006.01)
*H04N 1/00* (2006.01)

(52) U.S. Cl.
CPC ..... *H04N 1/00419* (2013.01); *H04N 1/00228* (2013.01); *H04N 1/00384* (2013.01); *H04N 2201/0093* (2013.01)

(58) Field of Classification Search
None
See application file for complete search history.

(56) References Cited

U.S. PATENT DOCUMENTS

2014/0362399 A1* 12/2014 Sugimoto .......... H04N 1/00381
 358/1.15
2015/0026633 A1* 1/2015 Sugimoto ............. G06F 21/608
 715/778

FOREIGN PATENT DOCUMENTS

| JP | 2005-101796 A | 4/2005 |
| JP | 2005-191849 A | 7/2005 |
| JP | 2013-088833 A | 5/2013 |

* cited by examiner

*Primary Examiner* — Andrew H Lam
(74) *Attorney, Agent, or Firm* — Oliff PLC

(57) ABSTRACT

An information processing apparatus includes a first display controller, a second display controller, an image display controller, and a first switching unit. The first display controller performs control such that a first screen is displayed on a display. The first screen is a screen that shows a specified destination and includes a first image for accepting an operation for inputting a character string representing a destination. The second display controller performs control such that a second screen is displayed. The second screen is a screen that shows a specified destination. The image display controller performs control, in response to a predetermined operation performed while the second screen is displayed, such that a second image for accepting an operation for inputting a character string representing a destination is displayed on the display. The first switching unit switches between the first screen and the second screen.

14 Claims, 19 Drawing Sheets

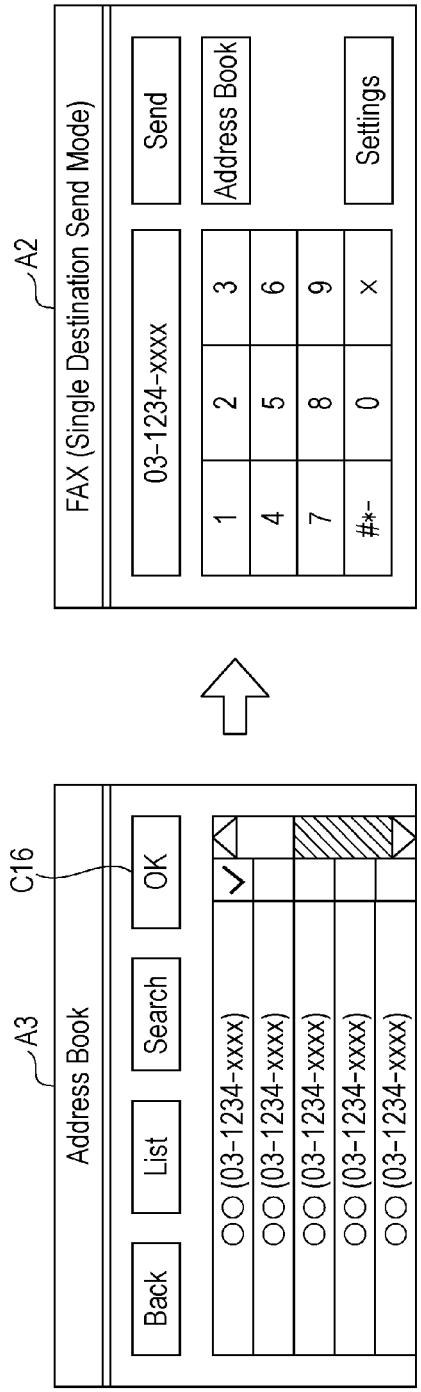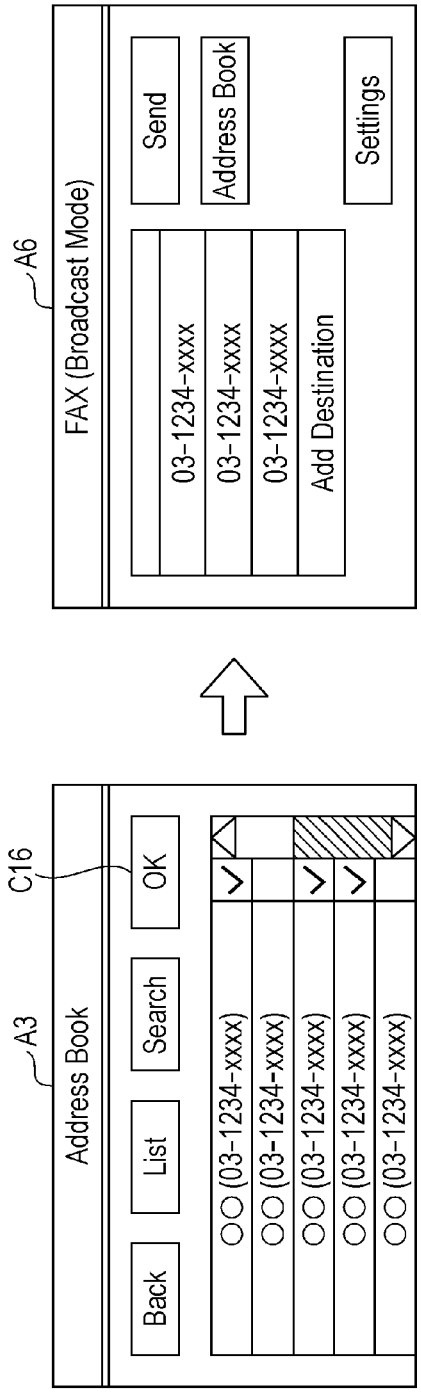

INFORMATION PROCESSING APPARATUS SWITCHING BETWEEN FIRST AND SECOND SCREENS AND INFORMATION PROCESSING METHOD THEREOF

CROSS-REFERENCE TO RELATED APPLICATIONS

This application is based on and claims priority under 35 USC 119 from Japanese Patent Application No. 2016-056736 filed Mar. 22, 2016.

BACKGROUND

Technical FIELD

The present invention relates to an information processing apparatus and an information processing method.

SUMMARY

According to an aspect of the invention, there is provided an information processing apparatus including a first display controller, a second display controller, an image display controller, and a first switching unit. The first display controller performs control such that a first screen is displayed on a display. The first screen is a screen that shows a specified destination and includes a first image for accepting an operation for inputting a character string representing a destination. The second display controller performs control such that a second screen is displayed. The second screen is a screen that shows a specified destination. The image display controller performs control, in response to a predetermined operation performed while the second screen is displayed, such that a second image for accepting an operation for inputting a character string representing a destination is displayed on the display. The first switching unit switches between the first screen and the second screen.

BRIEF DESCRIPTION OF THE DRAWINGS

An exemplary embodiment of the present invention will be described in detail based on the following figures, wherein:

FIGS. 17A and 17B each illustrate an example of a screen transition in accordance with the modification;

DETAILED DESCRIPTION

1. Exemplary Embodiment

Figure 1:
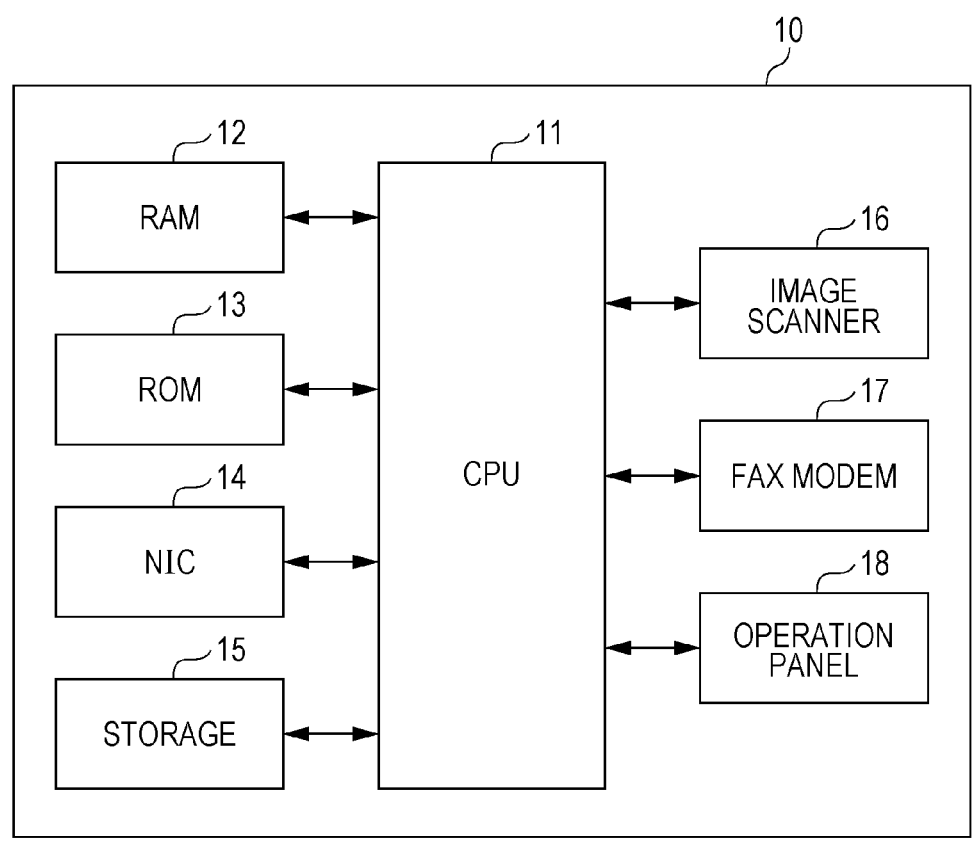
FIG. 1 illustrates a hardware configuration of an image processing apparatus according to an exemplary embodiment.

FIG. 1 illustrates a hardware configuration of an image processing apparatus 10 according to an exemplary embodiment. The image processing apparatus 10 has a function of scanning an image on a medium such as paper and sending image data obtained by scanning to a destination by fax communication. The image processing apparatus 10 is a computer including a central processing unit (CPU) 11, a random access memory (RAM) 12, a read only memory (ROM) 13, a network interface card (NIC) 14, a storage 15, an image scanner 16, a fax modem 17, and an operation panel 18.

The CPU 11 controls operations of individual components by executing a program stored in the ROM 13 or the storage 15 by using the RAM 12 as its workspace. The NIC 14 includes a communication circuit and communicates with an external apparatus. The storage 15 is a storage medium, such as a hard disk drive (HDD) or a solid state drive (SSD). The storage 15 stores data and a program that are used by the CPU 11 for control.

The image scanner 16 includes an image sensor or the like. The image scanner 16 optically scans an image on the surface of an original loaded at the image processing apparatus 10. The image scanner 16 supplies image data representing the scanned image to the CPU 11. The fax modem 17 includes a communication circuit for fax communication. The fax modem 17 sends image data to a destination specified using a fax number and receives image data sent to a fax number assigned to the image processing apparatus 10.

The operation panel 18 includes a display and a touch panel disposed on the display. The operation panel 18 serves as a display that displays an image on a display surface thereof and serves as an operation accepting unit that accepts a user operation.

The CPU 11 executes a program and controls individual components. In this way, functions described below are implemented.

Figure 2:
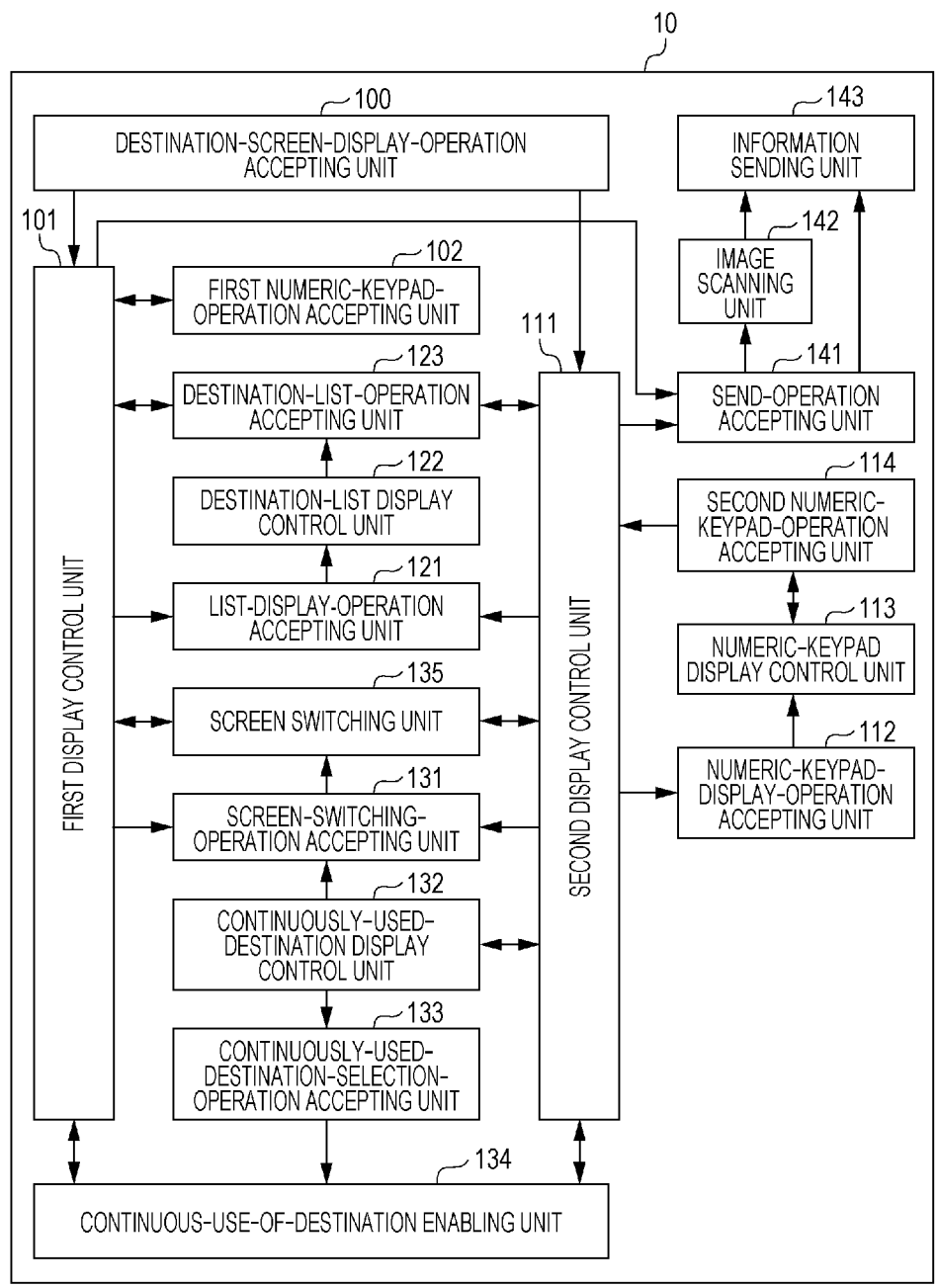
FIG. 2 illustrates a functional configuration implemented by the image processing apparatus.

FIG. 2 illustrates a functional configuration implemented by the image processing apparatus 10. The image processing apparatus 10 includes a destination-screen-display-operation accepting unit 100, a first display control unit 101, a first numeric-keypad-operation accepting unit 102, a second display control unit 111, a numeric-keypad-display-operation accepting unit 112, a numeric-keypad display control unit 113, a second numeric-keypad-operation accepting unit 114, a list-display-operation accepting unit 121, a destination-list display control unit 122, a destination-list-operation accepting unit 123, a screen-switching-operation accepting unit 131, a continuously-used-destination display control unit 132, a continuously-used-destination-selection-operation accepting unit 133, a continuous-use-of-destination enabling unit 134, a screen switching unit 135, a send-operation accepting unit 141, an image scanning unit 142, and an information sending unit 143.

The destination-screen-display-operation accepting unit 100 accepts an operation for displaying a destination display screen in which a destination of a fax is specified. The destination-screen-display-operation accepting unit 100 accepts, as this operation, an operation performed in a menu screen of the image processing apparatus 10, for example.

Figure 3:
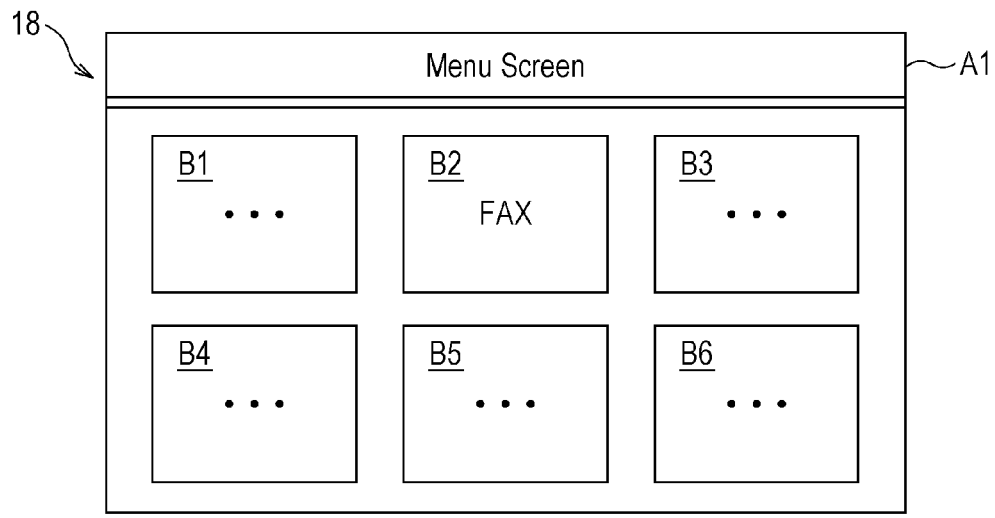
FIG. 3 illustrates an example of a menu screen of the image processing apparatus.

FIG. 3 illustrates an example of a menu screen of the image processing apparatus 10. In the example illustrated in FIG. 3, a menu screen A1 showing icon images B1 to B6 is displayed on the operation panel 18. Among these icon image B1 to B6, the icon image B2 shows a character string "FAX". The destination-screen-display-operation accepting unit 100 accepts an operation for selecting this icon image B2 as the operation for displaying the destination display screen.

Upon accepting an operation for displaying the destination display screen, the destination-screen-display-operation accepting unit 100 notifies, for example, one of the first display control unit 101 and the second display control unit 111 that is selected by a setting of acceptance of this operation. The case where the first display control unit 101 receives this notification will be described below.

The first display control unit 101 performs control such that a destination display screen that shows a specified destination is displayed on the operation panel 18, which is a display.

Figure 4:
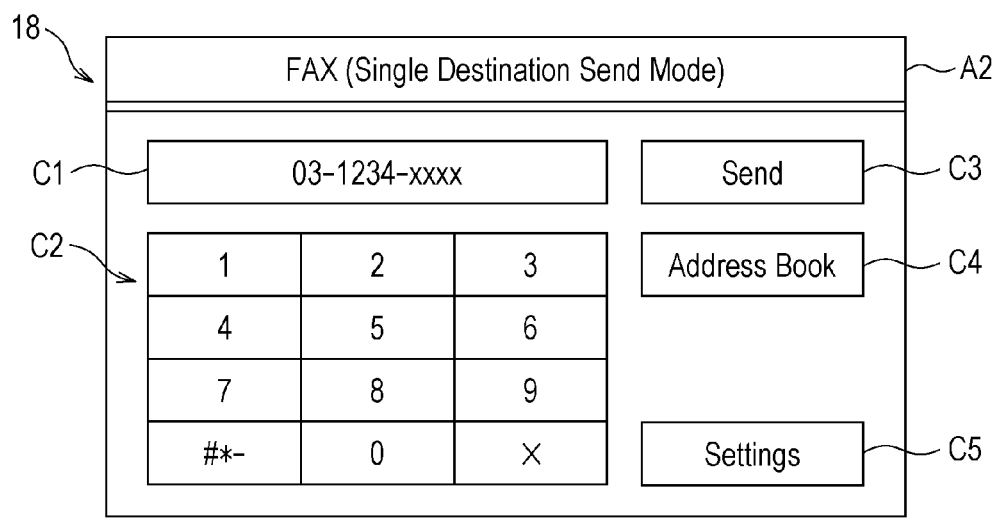
FIG. 4 illustrates an example of a destination display screen displayed under control by a first display control unit.

FIG. 4 illustrates an example of the destination display screen displayed under control by the first display control unit 101. In the example illustrated in FIG. 4, a destination display screen A2 including a character string "FAX (Single Destination, Send Mode)" is displayed. The first display control unit 101 performs control such that the destination display screen A2 is displayed. The destination display screen A2 includes a destination display field C1, a numeric keypad image C2, a send operation image C3, an address book image C4, and a setting operation image C5.

The destination display field C1 is a field that shows a destination specified by the user. The numeric keypad image C2 is an image for accepting an operation for inputting a character string representing a destination. The send operation image C3 is an image for accepting an operation for instructing sending to the specified destination. The address book image C4 is an image for accepting an operation for displaying an address book including destinations registered in advance. The setting operation image C5 is an image for accepting an operation for changing a setting (described below). The numeric keypad image C2 is an example of a "first image" according to an aspect of the present invention. The destination display screen A2 including the numeric keypad image C2 is an example of a "first screen" according to an aspect of the present invention.

The first display control unit 101 supplies position information (information indicating a position) of each key in the displayed numeric keypad image C2 to the first numeric-keypad-operation accepting unit 102. The first display control unit 101 also supplies position information of the displayed send operation image C3 and the destination shown at the destination display field C1 to the send-operation accepting unit 141. The first display control unit 101 also supplies position information of the displayed address book image C4 to the list-display-operation accepting unit 121 and supplies position information of the displayed setting operation image C5 to the screen-switching-operation accepting unit 131.

Upon the user performing operations on the numeric keypad image C2 to input numerals representing a fax number, the first numeric-keypad-operation accepting unit 102 accepts these operations by using the supplied position information. The first numeric-keypad-operation accepting unit 102 supplies the numerals input through the accepted operations to the first display control unit 101. The first display control unit 101 performs control such that a fax number represented by the supplied numerals, that is, a specified fax number, is shown at the destination display field C1. If the user performs an operation for pressing the send operation image C3 in that state, the send-operation accepting unit 141 accepts the operation as an operation for instructing sending of a fax to the specified destination.

Upon accepting this operation, the send-operation accepting unit 141 notifies the image scanning unit 142 of acceptance of the operation and supplies the information sending unit 143 with the destination supplied from the first display control unit 101, that is, the destination shown at the destination display field C1. Upon receipt of this notification, the image scanning unit 142 scans an image on an original loaded at the image processing apparatus 10 and supplies the data of the scanned image to the information sending unit 143. The information sending unit 143 sends the image data supplied from, the image scanning unit 142 to the destination supplied from the send-operation accepting unit 141.

Upon the user performing an operation for pressing the address book image C4, the list-display-operation accepting unit 121 accepts the operation as an operation for displaying the address book. Upon accepting this operation, the list-display-operation accepting unit 121 notifies the destination-list display control unit 122 of acceptance of the operation. Upon receipt of this notification, the destination-list display control unit 122 controls a display to display a screen allowing selection of a destination from the address book, that is, a screen allowing the user to select one or more destinations from multiple destinations registered in the address book.

Figure 5:
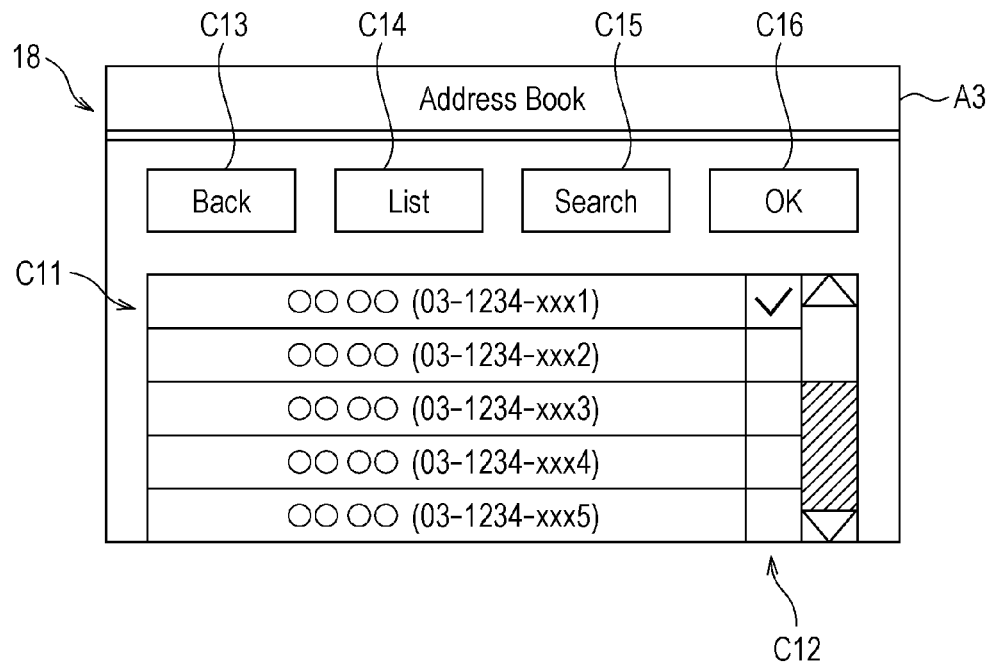
FIG. 5 illustrates an example of a displayed address book.

FIG. 5 illustrates an example of the displayed address book. In the example illustrated in FIG. 5, the destination-list display control unit 122 performs control such that an address book screen A3 including a character string "Address Book" is displayed. The address book screen A3 is an example of a "third screen" according to an aspect of the present invention. The destination-list display control unit 122 is an example of a "third display controller" according to an aspect of the present invention. The address book screen A3 includes a destination list display field C11, a checkbox image C12, a back button image C13, a list button image C14, a search button linage C15, and a destination confirmation operation image C16. The destination list display field C11 shows, for example, destination information indicating destinations registered by the user in advance. The checkbox image C12 shows a check mark image indicating a destination selected by the user (the destination listed at the top is selected in this example).

In response to an operation for pressing the back button image C13, displaying of the address book screen A3 is cancelled and the displayed screen returns to the destination display screen A2 illustrated in FIG. 4. In response to an operation for pressing the search button image C15, the screen showing the destination list display field C11 is switched to a search screen for searching for a destination. In response to an operation for pressing the list button image C14 in the search screen, the displayed screen is switched again to the screen showing the destination list display field C11. In response to an operation for pressing the destination confirmation operation image C16, the destination checked with the checkbox image C12, that is, the destination selected by the user, is confirmed.

The destination-list-operation accepting unit 123 accepts these operations and supplies the destination selected by the user to the first display control unit 101. The first display control unit 101 performs control such that the supplied destination, that is, the destination selected by the user in the address book screen A3, is shown at the destination display field C1 illustrated in FIG. 4. As described above, the user specifies the destination of a fax by operating the numeric keypad image C2 in the destination display screen A2 and by selecting a destination in the address book screen A3.

In response to an operation for pressing the setting operation image C5 in the destination display screen A2, a settings screen is displayed.

Figure 6:
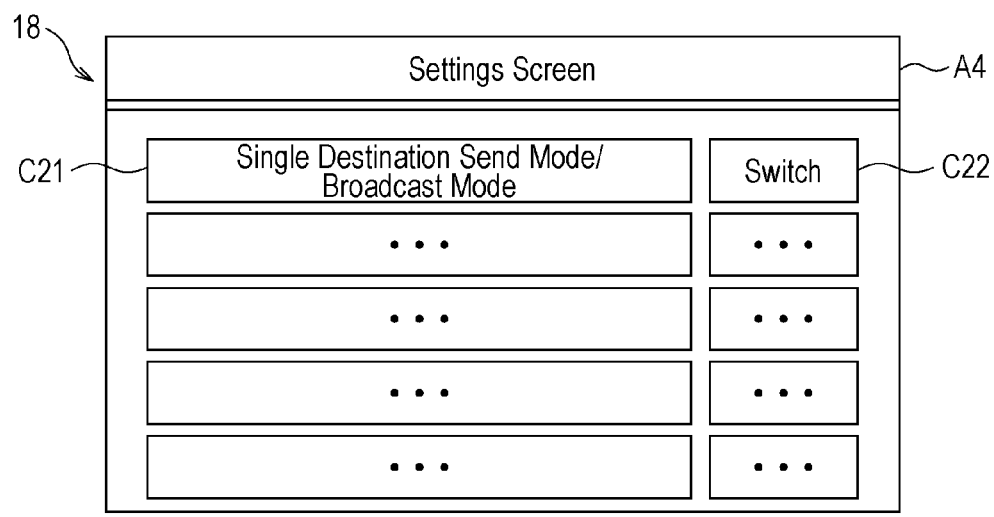
FIG. 6 illustrates an example of a displayed settings screen.

FIG. 6 illustrates an example of the displayed settings screen. In the example in FIG. 6, a settings screen A4 shows a setting field C21 indicating a setting regarding "Single Destination Send Mode/Broadcast Mode" and a switching operation image C22 for accepting an operation for switching between these modes. The single destination send mode is a mode in which information is sent to one specified destination. The broadcast mode is a mode in which information is sent to two or more specified destinations. If the user performs an operation for pressing the switching operation image C22, a switching confirmation screen for asking the user whether to confirm switching of the mode is displayed.

Figure 7:
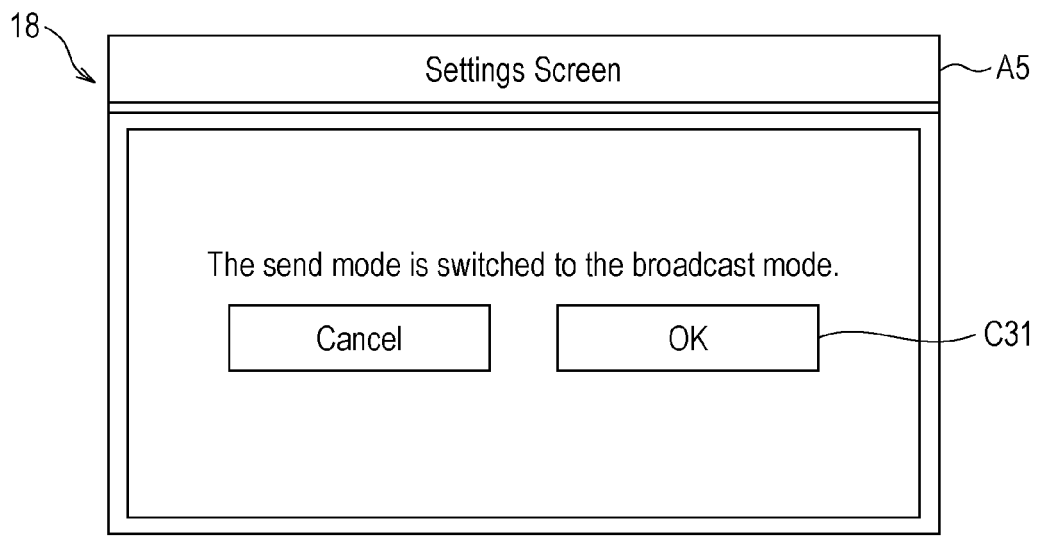
FIG. 7 illustrates an example of a displayed switching confirmation screen.

FIG. 7 illustrates an example of the displayed switching confirmation screen. In the example in FIG. 7, a switching confirmation screen A5 including a character string "The send mode is switched to the broadcast mode." and a switching confirmation operation image C31 is displayed. If the user performs an operation for pressing this switching confirmation operation image C31, the screen-switching-operation accepting unit 131 accepts this operation as an operation for switching the send mode from the single destination send mode to the broadcast mode and notifies the screen switching unit 135 of acceptance of the operation.

The screen switching unit 135 switches between the screen displayed under control by the first display control unit 101 and the screen displayed under control by the second display control unit 111, The screen switching unit 135 is an example of a "first switching unit" according to an aspect of the present invention. Upon receipt of a notification from the screen-switching-operation accepting unit 131 as illustrated in the example in FIG. 7, the screen switching unit 135 switches the destination display screen A2 displayed under control by the first display control unit 101 to a screen displayed under control by the second display control unit 111. Specifically, the screen switching unit 135 instructs the second display control unit 111 to display a destination display screen for the broadcast mode. In this way, the screen switching unit 135 performs this switching.

Like the first display control unit 101, the second display control unit 111 performs control such that a destination display screen that snows a specified destination is displayed on the operation panel 18, which is a display.

Figure 8:
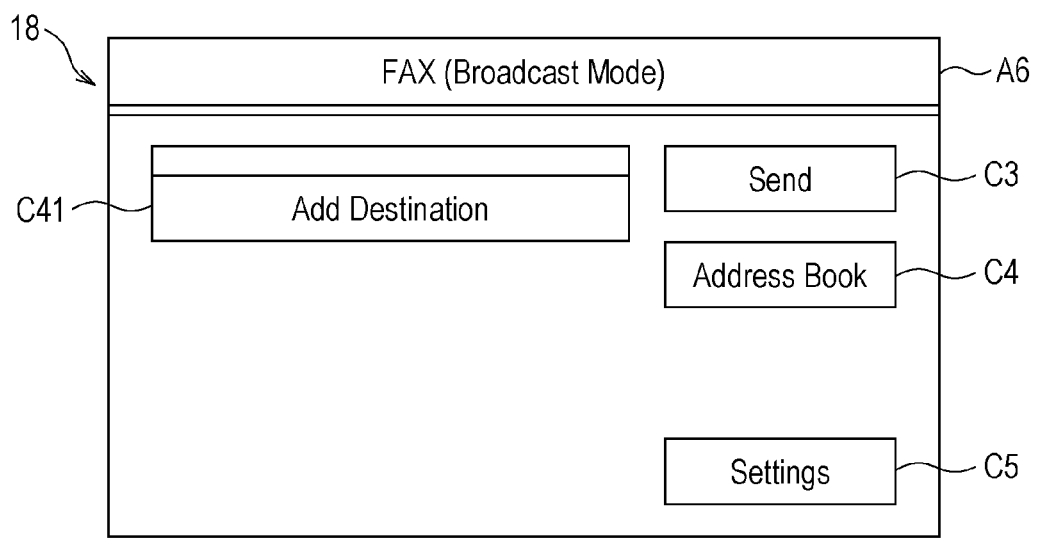
FIG. 8 illustrates an example of a destination display screen displayed under control by a second display control unit.

FIG. 8 illustrates an example of the destination display screen displayed under control by the second display control unit 111. In the example in FIG. 8, a destination display screen A6 including a character string "(FAX Broadcast Mode)" is displayed. The second display control unit 111 performs control such that the destination display screen A6 is displayed. The destination display screen A6 includes a destination adding operation image C41 as well as the send operation image C3, the address hook image C4, and the setting operation image C5 illustrated in FIG. 4 but does not include the numeric keypad image C2 illustrated in FIG. 4, that is, an image for accepting an operation for inputting a character string representing a destination.

The second display control unit 111 supplies position information of the displayed send operation image C3 to the send-operation accepting unit 141, supplies position information of the displayed address book image C4 to the list-display-operation accepting unit 121, and supplies position information of the displayed setting operation image C5 to the screen-switching-operation accepting unit 131. The second display control unit 111 also supplies position information of the displayed destination adding operation image C41 to the numeric-keypad-display-operation accepting unit 112.

Upon the user performing an operation for pressing the destination adding operation image C41, the numeric-keypad-display-operation accepting unit 112 accepts the operation as an operation for displaying the numeric keypad on the basis of the supplied position information. Upon accepting the operation, the numeric keypad-display-operation accepting unit 112 notifies the numeric-keypad display control unit 113 of acceptance of the operation. Upon receipt of this notification, that is, in response to an operation for displaying the numeric keypad image performed while the destination display screen A6 is displayed, the numeric-keypad display control unit 113 performs control such that the numeric keypad image is displayed on the display.

Figure 9:
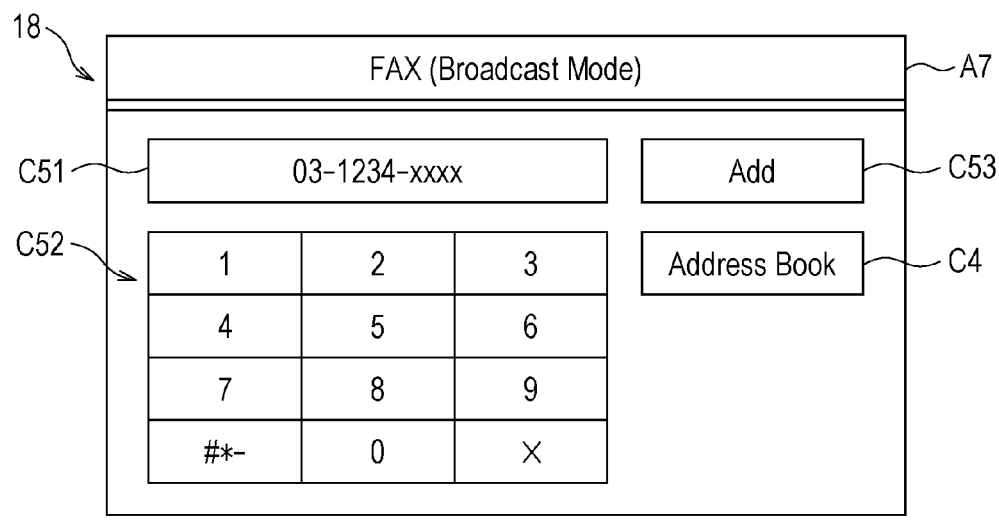
FIG. 9 illustrates an example of a numeric keypad image displayed under control by a numeric-keypad display control unit.

FIG. 9 illustrates an example of the numeric keypad image displayed under control by the numeric-keypad display control unit 113. In the example in FIG. 9, the numeric-keypad display control unit 113 performs control such that a destination specification screen A7 is displayed. The destination specification screen A7 includes a destination display field C51, a numeric keypad image C52, a destination adding operation image C53, and the address book image C4. The destination display field C51 is a field that shows a destination specified by the user. The numeric keypad image C52 is an image for accepting an operation for inputting a character string representing a destination. The destination adding operation image C53 is an image for accepting an operation for adding a specified destination to destination(s) shown in the destination display screen AS illustrated in FIG. 8. The numeric keypad image C52 is an example of a "second image" according to an aspect of the present invention. The numeric-keypad display control unit 113 that performs control such that the numeric keypad image C52 is displayed is an example of an "image display controller" according to an aspect of the present invention.

The numeric-keypad display control unit 113 supplies position information of each key in the displayed numeric keypad image C52 to the second numeric-keypad-operation accepting unit 114. If the user operates the numeric keypad image C52 to input numerals representing a fax number, the second numeric-keypad-operation accepting unit 114 accepts these operations on the basis of the supplied position information. The second numeric-keypad-operation accepting unit 114 supplies the numerals input through the accepted operations to the second display control unit 111. The second display control unit 111 performs control such that the fax number represented by the supplied numerals, that is, the specified fax number, is shown at the destination display screen A6. Note that the destination may be specified in the address book screen A3 illustrated in FIG. 5 as well as the destination specification screen A7.

Figure 10:
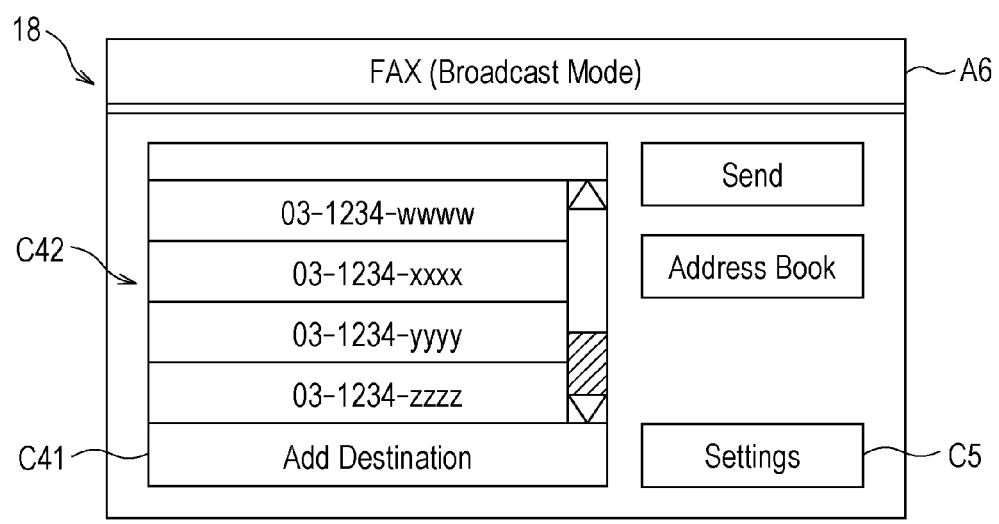
FIG. 10 illustrates an example of a destination display screen that shows destinations.

FIG. 10 illustrates an example of the destination display screen A6 that shows the destinations. In the example in FIG. 10, the second display control unit 111 performs control such that the destination display screen A6 is displayed which includes a list C42 of the destinations specified in the destination specification screen A7. The list C42 of the destinations includes two or more destinations. In this way, two or more destinations are shown in the destination display screen A6, which is an example of a "second screen" according to an aspect of the present invention. In contrast, the destination display screen A2 illustrated in FIG. 4 displays just one destination instead of two or more destinations.

In response to an operation for pressing the setting operation image C5 in the destination display screen A6, the settings screen A4 illustrated in FIG. 6 is displayed. The image processing apparatus 10 allows one of the destinations specified in the broadcast mode to be continuously used also in the single destination send mode. Accordingly, when the destination display screen for the broadcast mode is switched to the destination display screen for the single destination send mode in response to an operation on the switching operation image C22, the continuously-used-destination display control unit 132 performs control such that a switching confirmation screen is displayed which asks the user whether to confirm switching to the single destination send mode and allows the user to select a destination continuously used in the single destination send mode.

Figure 11:
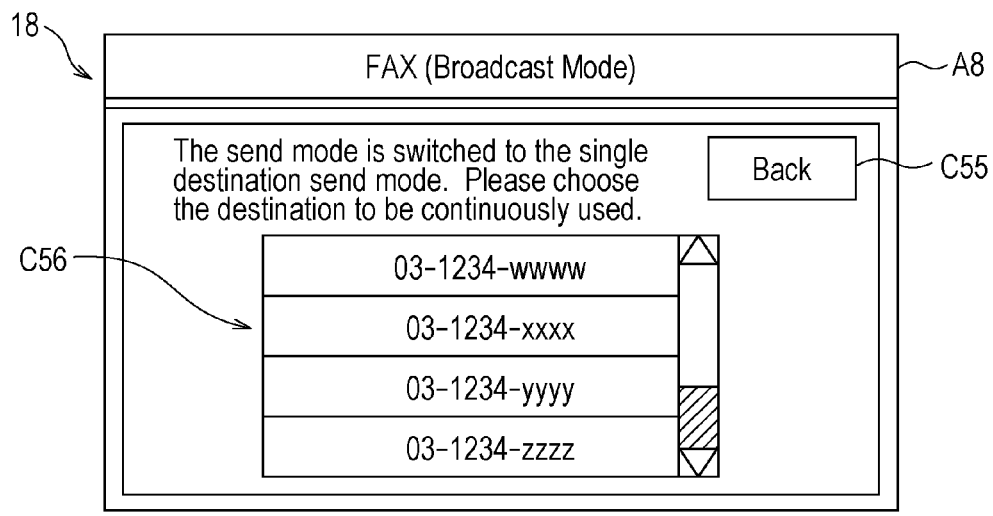
FIG. 11 illustrates an example of a displayed switching confirmation screen.

FIG. 11 illustrates an example of the displayed switching confirmation screen. In the example in FIG. 11, the continuously-used-destination display control unit 132 performs control such that a switching confirmation screen A8 is displayed. The switching confirmation screen A8 includes a character string "The send mode is switched to the single destination send mode. Please choose the destination to be continuously used.", a back button image C55, and a continuously-used-destination selection image C56. In response to an operation for pressing the back button image C55, the second display control unit 111 performs control such that the destination display screen A6 is displayed again instead of switching the send mode to the single destination send mode.

The continuously-used-destination selection image C56 is an image that shows a list of destinations specified by the user in the broadcast mode and that accepts an operation for selecting a destination continuously used in the single destination send mode from those specified in the broadcast mode. In this way, the continuously-used-destination display control unit 132 controls the display to display the switching confirmation screen A8 including the continuously-used-destination selection image C56, that is, a screen allowing the user to select one of the destinations shown in the screen before switching (the destination display screen A6 in this exemplary embodiment). The switching confirmation screen A8 is an example of a "fourth screen" according to an aspect of the present invention. The continuously-used-destination display control unit 132 is an example of a "fourth display controller" according to an aspect of the present invention. The continuously-used-destination display control unit 132 supplies position information of each displayed destination to the continuously-used-destination-selection-operation accepting unit 133.

Upon the user performing an operation for selecting a destination to be continuously used from this list, the continuously-used-destination-selection-operation accepting unit 133 accepts this operation as an operation for setting the selected destination as the continuously used destination on the basis of the supplied position information and supplies the destination to the continuous-use-of-destination enabling unit 134. When the destination display screens A2 and A6 are switched between, the continuous-use-of-destination enabling unit 134 enables a destination shown in the screen before switching to be also shown in the screen after the switching. The continuous-use-of-destination enabling unit 134 is an example of a "continuous-use enabling unit" according to an aspect of the invention.

In this exemplary embodiment, the continuous-use-of-destination enabling unit 134 enables continuous use of the destination selected by the user in the switching confirmation screen A8. Specifically, the continuous-use-of-destination enabling unit 134 supplies the first display control unit 101 with the destination supplied from the continuously-used-destination-selection-operation accepting unit 133, thereby enabling continuous use of the destination. The first display control unit 101 performs control such that the destination supplied from the continuous-use-of-destination enabling unit 134 is shown at the destination display field C1 of the destination display screen A2.

Figure 12:
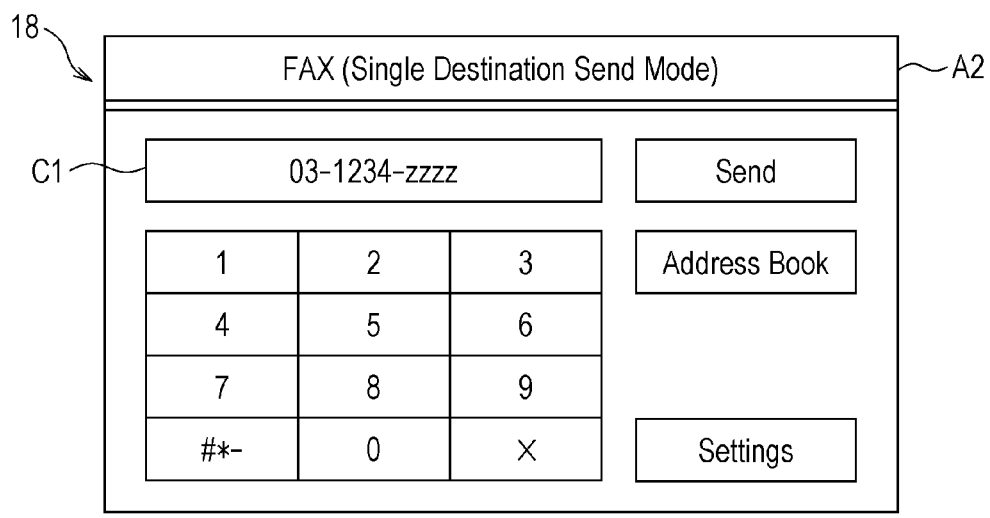
FIG. 12 illustrates an example of a continuously used destination.

FIG. 12 illustrates an example of the continuously used destination. In the example in FIG. 12, the first display control unit 101 performs control such that the destination "03-1234-zzzz", which is illustrated in FIG. 11, is continuously shown at the destination display field C1.

The image processing apparatus 10, which has the configuration described above, performs a first switching process for switching the destination display screen for the single destination send mode to the destination display screen for the broadcast mode and a second switching process for switching the destination display screen for the broadcast mode to the destination display screen for the single destination send mode.

Figure 13:
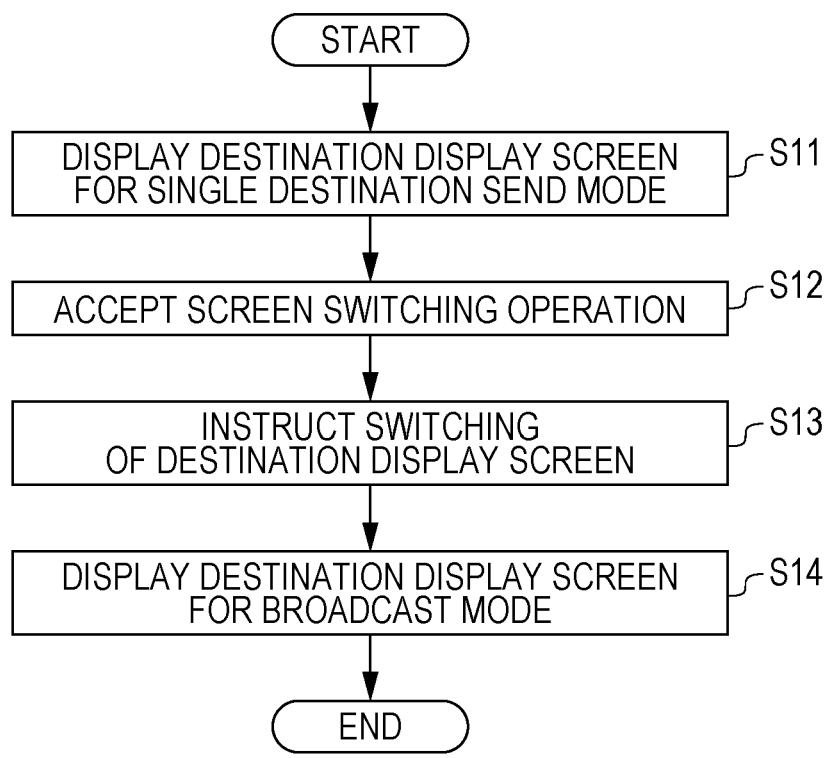
FIG. 13 illustrates an example of an operation procedure performed by the image processing apparatus during a first switching process.

FIG. 13 illustrates an example of an operation procedure performed by the image processing apparatus 10 during the first switching process. This operation procedure starts upon the user performing an operation for displaying the destination display screen for the single destination send mode (e.g., an operation for selecting the icon image B2 illustrated in FIG. 3). First, the image processing apparatus 10 (the first display control unit 101) performs control such that destination display screen for the single destination send mode (e.g., the destination display screen A2 illustrated in FIG. 4) is displayed on the display (step S11).

The image processing apparatus 10 (the screen-switching-operation accepting unit 131) then accepts an operation for switching the destination display screen (step S12). The image processing apparatus 10 (the screen switching unit 135) then issues an instruction for switching the destination display screen (an instruction for displaying the destination display screen for the broadcast mode in this example) (step S13). The image processing apparatus 10 (the second display control unit 111) then performs control such that the destination display screen for the broadcast mode (e.g., the destination display screen A6 illustrated in (FIG. 3) is displayed on the display (step S14).

Figure 14:
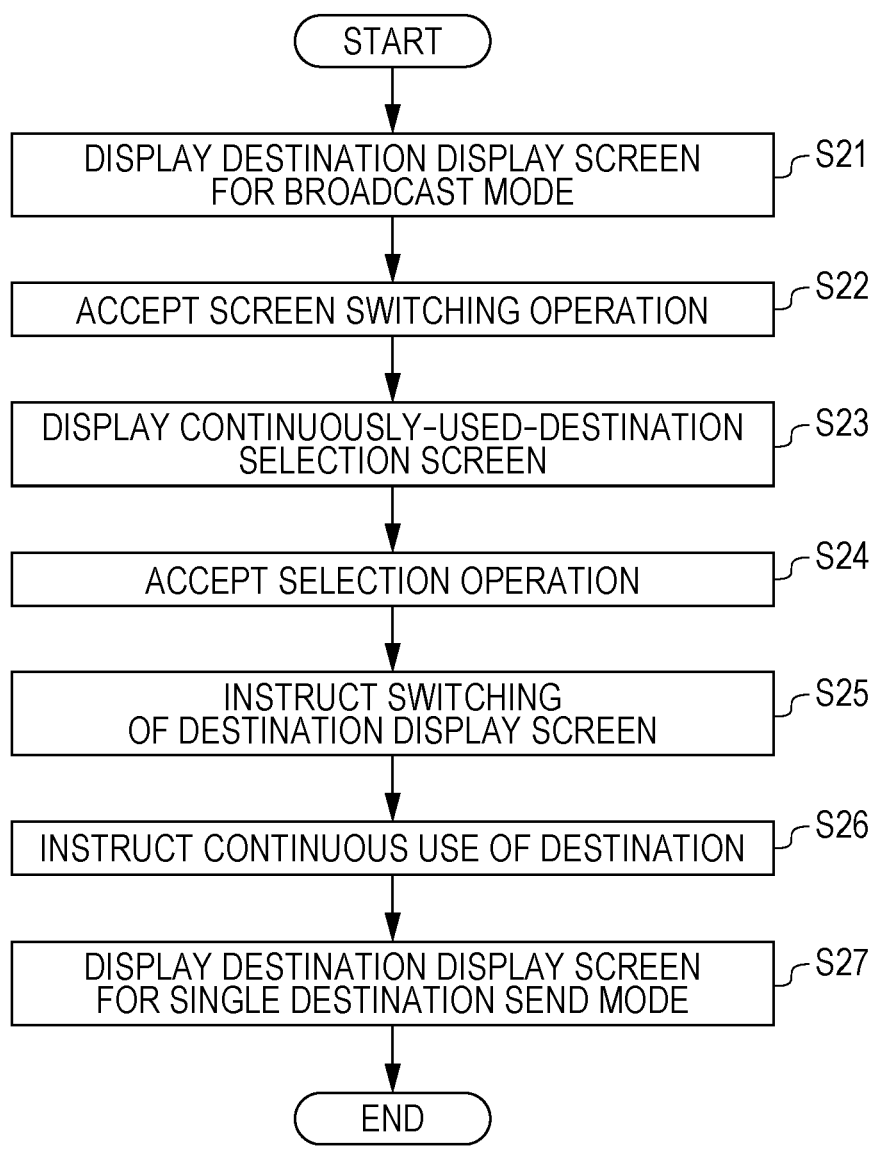
FIG. 14 illustrates an example of an operation procedure performed by the image processing apparatus during a second switching process.

FIG. 14 is an example of an operation procedure performed by the image processing apparatus 10 during the second switching process. This operation procedure starts upon the user performing an operation for displaying the destination display screen for the broadcast mode (e.g., an operation for switching the destination display screen described in the example of FIG. 13). First, the image processing apparatus 10 (the second display control unit 111) performs control such that the destination display screen for the broadcast mode (e.g., the destination display screen A6 illustrated in FIG. 8) is displayed on the display (step S21). The image processing apparatus 10 (the screen-switching-operation accepting unit 131) then accepts an operation for switching the destination display screen (step S22). The image processing apparatus 10 (the continuously-used-destination display control unit 132) then performs control such that a continuously-used-destination selection screen (e.g., the switching confirmation screen A8 illustrated in FIG. 11) is displayed (step S23).

The image processing apparatus 10 (the continuously-used-destination-selection-operation accepting unit 133) then accepts an operation for selecting a continuously used destination (step S24). The image processing apparatus 10 (the screen switching unit 135) then issues an instruction for switching the destination display screen (an instruction for displaying the destination display screen for the single destination send mode in this example) (step S25). The image processing apparatus 10 (the continuous-use-of-destination enabling unit 134) then issues an instruction to display the continuously used destination (step S26). The image processing apparatus 10 (the first display control unit 101) then performs control such that the destination display screen for the single destination send mode including the continuously used destination (e.g., the destination display screen A6 illustrated in FIG. 12) is displayed on the display (step S27).

In this exemplary embodiment, the numeric keypad image C52 illustrated in FIG. 9 is not displayed in the broadcast mode when the destination display screen A6 illustrated in FIG. 8 is displayed unless an operation for pressing the destination adding operation image C41 is performed. In contrast, in the single destination send mode, since the destination display screen A2 illustrated in FIG. 4 includes the numeric keypad image C2, characters representing a destination are selected without any operation for displaying the numeric keypad image. Accordingly, aspects of non-limiting embodiments of the above disclosure may effect to make a user operation less troublesome in the exemplary embodiment than in the case where an operation for displaying an image used for a destination specification operation (the numeric keypad image in the exemplary embodiment) needs to be performed all the time in a screen for specifying a destination.

In addition, aspects of non-limiting embodiments of the above disclosure may effect to make a user operation less troublesome in the single destination send mode, that is, when the number of destinations shown in the destination display screen is one. Further, in the exemplary embodiment, continuous use of a destination is enabled when the destination display screen is switched. Accordingly, aspects of non-limiting embodiments of the above disclosure may effect to make an operation tor switching the destination display screen less troublesome than in the case where continuous use of a destination is not enabled. Furthermore, in the exemplary embodiment, the switching confirmation screen A8 illustrated in FIG. 11 is displayed. Accordingly, aspects of non-limiting embodiments of the above disclosure may effect such that the user is allowed to determine a destination to be continuously used.

2. Modifications

The exemplary embodiment described above is merely an example of how the present invention is embodied and may be modified in the following manner. In addition, the exemplary embodiment and each modification may fee carried out in combination as needed.

2-1. Number of Shown Destinations

The first display control unit 101 displays the destination display screen including one destination in the exemplary embodiment; however, the number of shown destinations is not limited to one. The first display control unit 101 may display a destination display screen including two or more destinations.

Figure 15:
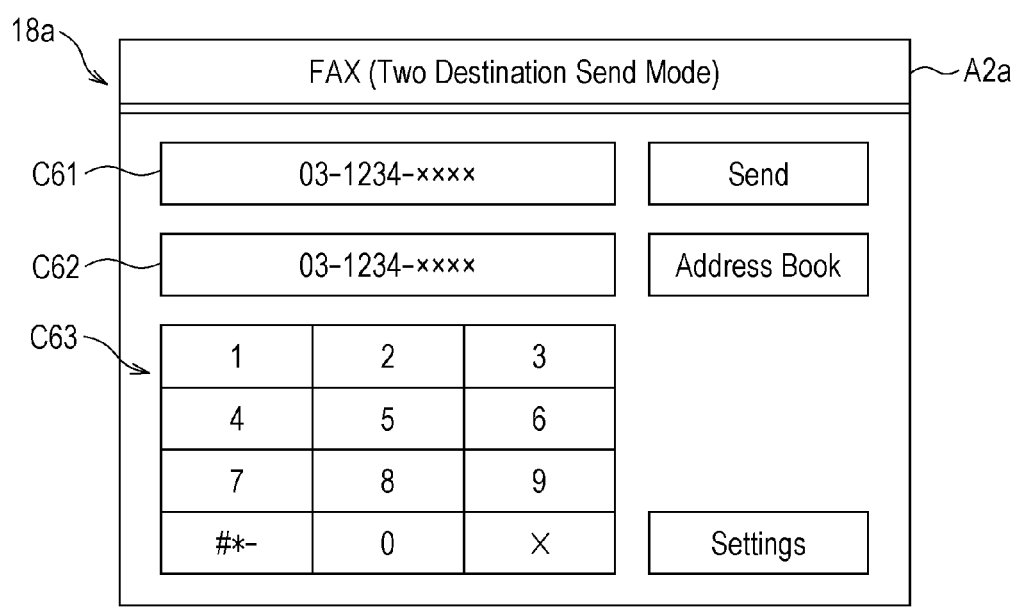
FIG. 15 illustrates an example of the destination display screen displayed under control by the first display control unit according to a modification.

FIG. 15 illustrates an example of the destination display screen displayed under control by the first display control unit 101 in accordance with a modification. In the example in FIG. 15, the first display control unit 101 performs control such that a destination display screen A2a is displayed on an operation panel 18a. The destination display screen A2a includes a first destination display field C61, a second destination display field C62, and a numeric keypad image C63.

The numeric keypad image C63 and the numeric keypad image C2 illustrated in FIG. 4 have substantially the same size. The first and second destination display fields C61 and C62 and the destination display field C1 illustrated in FIG. 4 have substantially the same size. The operation panel 18a has a display screen larger than the operation panel 18 illustrated in FIG. 4. Accordingly, even when two destination display fields are shown, the numeric keypad image is not displayed in a smaller size. As described above, if the display screen has an extra space, the first display control unit 101 may display a destination display screen including two or more destinations.

Even in such a case, the first display control unit 101 desirably displays a destination display screen including a number of destinations that is less than a predetermined number, and the second display control unit 111 desirably displays a destination display screen including a number of destinations greater than or equal to the predetermined number. The predetermined number is a number with which the size of the numeric keypad image is maintained so that the user feels easy-to-operate as long as the number of destinations shown together with the numeric keypad image is less than the predetermined number, for example. Even in such a case, aspects of non-limiting embodiments of the above disclosure may effect to make a user operation less troublesome in the case where the number of destinations shown in the destination display screen is less than the predetermined number as in the exemplary embodiment.

2-2. Plumber of Selected Destinations

The destination display screen to be displayed subsequently to the address book screen A3 illustrated in FIG. 5 may change depending on the number of destinations selected by the user.

Figure 16:
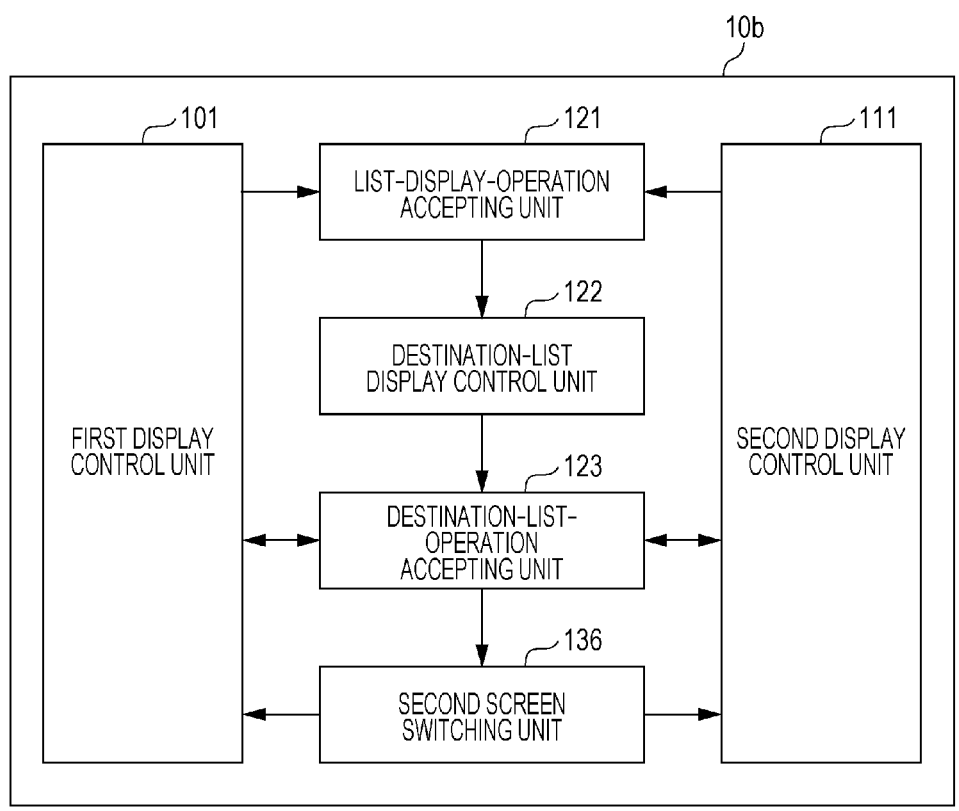
FIG. 16 illustrates a functional configuration implemented by an image processing apparatus according to a modification.

FIG. 16 illustrates a functional configuration implemented by an image processing apparatus 10b according to a modification. The image processing apparatus 10b includes the first display control unit 101, the second display control unit 111, the list-display-operation accepting unit 121, the destination-list display control unit 122, the destination-list-operation accepting unit 123, and a second screen switching unit 136. Note that FIG. 16 omits illustration of functional units not related to the description of this modification (the same applies to the following diagrams illustrating the functional, configuration).

The destination-list-operation accepting unit 123 supplies the second screen switching unit 136 with destination(s) for which a user selection operation has been accepted in the address book screen A3 illustrated in FIG. 5. The second screen switching unit 136 switches the address book screen A3 to the destination display screen for the single destination send mode if the number of destinations selected in the address book screen A3 is less than the predetermined number (if one destination is selected in the following example) and switches the address book screen A3 to the destination display screen for the broadcast mode if the number of selected destinations is greater than or equal to the predetermined number (if two or more destinations are selected in the following example). The second screen switching unit 136 is an example of a "second switching unit" according to an aspect of the present invention.

If the screen to be displayed after switching is the destination display screen for the single destination send mode, the second screen switching unit 136 supplies the first display control unit 101 with the destination supplied from the destination-list-operation accepting unit 123 and instructs the first display control unit 101 to display the destination display screen. If the screen to be displayed after switching is the destination display screen for the broadcast mode, the second screen switching unit 136 supplies the second display control unit 111 with the destinations and instructs the second display control unit 111 to display the destination display screen. In this way, the second screen switching unit 136 performs switching of the screen from the address book screen A3.

FIGS. 17A and 17B each illustrate an example of a screen transition according to the modification. In FIG. 17A, one destination is selected in the address book screen A3. If an operation for pressing the destination confirmation operation image C16 is performed in this state, the second screen switching unit 136 switches the screen to the destination display screen A2 for the single destination send mode. In FIG. 17B, three destinations are selected in the address book screen A3. If an operation for pressing the destination confirmation operation image C16 is performed in this state, the second screen switching unit 136 switches the screen to the destination display screen A5 for the broadcast mode.

For example, suppose that the user has realized that the number of destinations to which information is to be sent is not one but is two or more after opening the address book screen A3 from the destination display screen A2. In such a case, it takes time to display the destination display screen A6 and then the address book screen A3 after temporarily returning to the destination display screen A2 and then performing the screen switching operation. In this modification, however, even in such a case, information is sent in the broadcast mode if the user specifies two or more destinations in the displayed address book screen A3. Thus, aspects of non-limiting embodiments of the above disclosure may effect such that the user's time and effort is reduced compared with the case where the screen is not switched by the second screen switching unit 136.

2-3. Deletion of Destination

The send mode may be switched to the single destination send mode if the number of destinations shown in the broadcast mode becomes less than the predetermined number (e.g. becomes equal to one) as a result of deletion of the destination.

Figure 18:
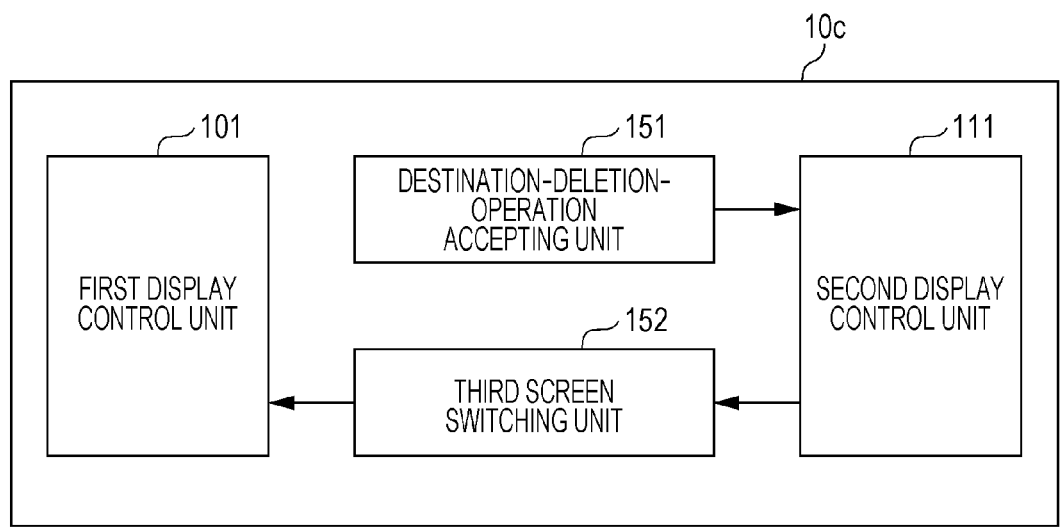
FIG. 18 illustrates a functional configuration implement by an image processing apparatus according to a modification.

FIG. 18 illustrates a functional configuration implemented by an image processing apparatus 10c according to a modification. The image processing apparatus 10c includes the first display control unit 101, the second display control unit 111, a destination-deletion-operation accepting unit 151, and a third screen switching unit 32.

The destination-deletion-operation accepting unit 151 accepts an operation for deleting a destination shown in the destination display screen A6. The destination-deletion-operation accepting unit 151 is an example of an "accepting unit" according to an aspect of the present invention. The operation for deleting a destination may be, for example, a flick on a destination or a tap on a deletion image that is displayed when a destination is long-pressed. The destination-deletion-operation accepting unit 151 instructs the second, display control unit 111 to delete the destination for which the deletion operation has been accepted. The second display control unit 111 deletes the specified destination from the destination display screen A6.

The second display control unit ill supplies the third screen switching unit 152 with destinations included in the destination display screen A6 for the broadcast mode that is displayed on the display. The second display control unit 111 supplies destinations every time a destination is added and every time a destination is deleted. If the number of destinations shown in the destination display screen A6 becomes less than the predetermined number (becomes one in the following example) from a number greater than or equal to the predetermined number (two or more in the following example) as a result of an operation accepted by the destination-deletion-operation accepting unit 151, the third screen switching unit 152 switches the destination display screen A6 to the destination display screen A2. The third screen switching unit 152 is an example of a "third switching unit" according to an aspect of the present invention.

If a state in which two or more destinations are supplied from the second display control unit 111 changes to a state in which one destination is supplied from the second display control unit 111, the third screen switching unit 152 supplies the first display control unit 101 with the one destination and instructs the first display control unit 101 to display the destination display screen. In this way, the third screen switching unit 152 switches the destination display screen A6 to the destination display screen A2.

Figure 19:
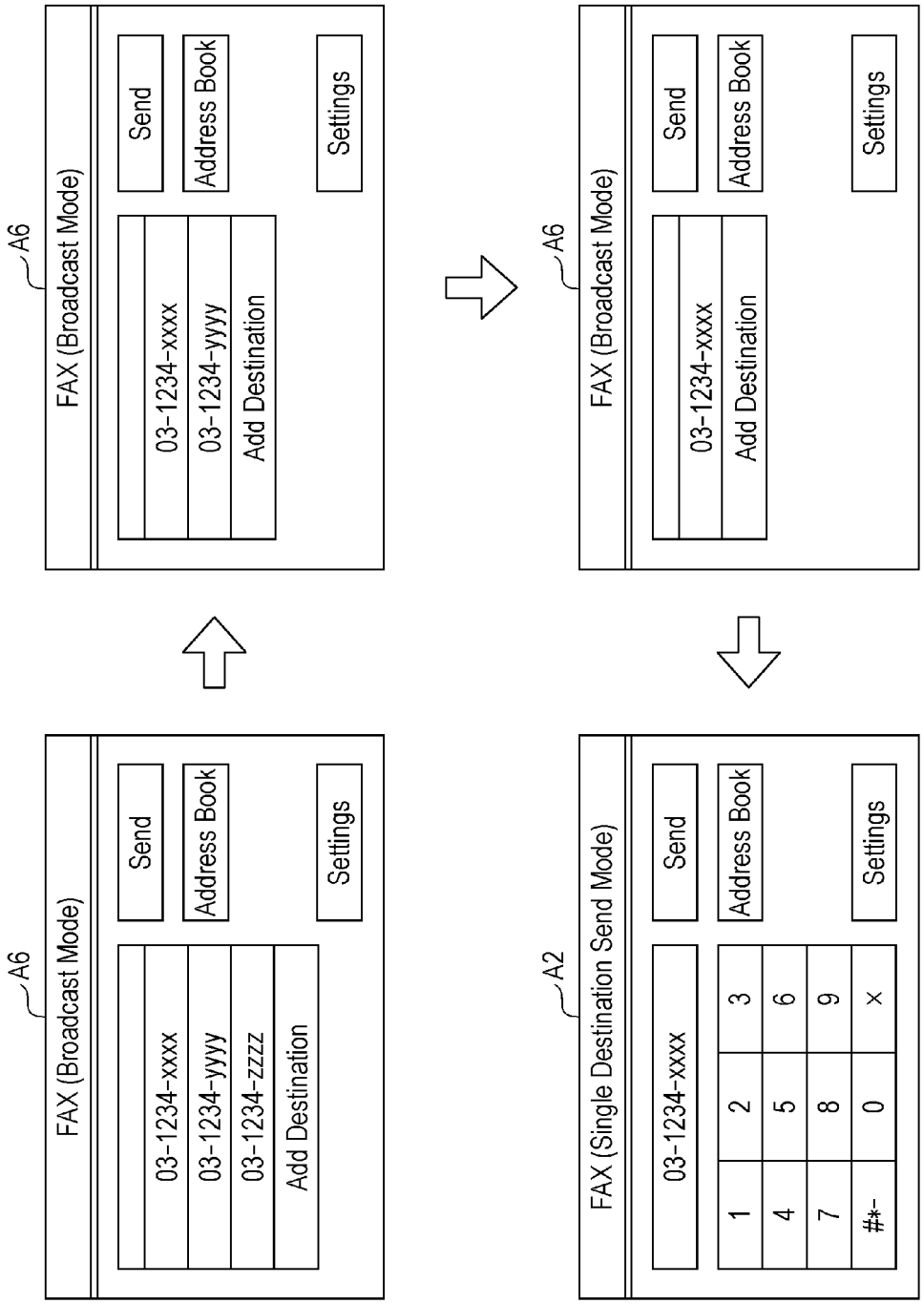
FIG. 19 illustrates an example of a screen transition in accordance with the modification.

FIG. 19 illustrates an example of a screen transition according to the modification. In FIG. 19, destinations "03-1234-zzzz" and "03-1234-yyyy" among three destinations specified in the destination display screen A6 are sequentially deleted one by one, and only the destination "03-1234-xxxx" is left. Thus, the third screen switching unit 152 switches the screen to the destination display screen A2 including the destination "03-1234-xxxx", which is the one that has been shown.

In this modification, the screen is switched to the destination display screen A2 when the number of destinations becomes less than the predetermined number, without requiring the user to perform an operation for switching the destination display screen A6 to the destination display screen A2. Thus, aspects of non-limiting embodiments of the above disclosure may effect such that the user's time and effort is reduced compared with the case where the screen is not switched by the third screen switching unit 152.

2-4. Continuous Use of Destination

In the exemplary embodiment, the continuous-use-of-destination enabling unit 134 enables a destination to be continuously used when the destination display screen for the broadcast mode is switched to the destination display screen for the single destination display screen; however, the configuration is not limited to this one. The continuous-use-of-destination enabling unit 134 may enable a destination to be continuously used when the destination display screen for the single destination send mode is switched to the destination display screen for the broadcast mode. In this case, one destination specified in the single destination send mode is continuously shown in the destination display screen for the broadcast mode.

In addition, if two or more destinations are specified in the destination display screen displayed under control by the first display control unit 101 as in the above-described modification, a continuously used destination may be selected from among the two or more destinations or all of the two or more destinations may be continuously used. In either case, aspects of non-limiting embodiments of the above disclosure may effect such that the continuous use of a destination reduces the user's time and effort for specifying a destination compared with the case where no destination is continuously used.

2-5. First Continuously-Used-Destination Determination Method

In the exemplary embodiment, the continuously used destination is selected by the user; however, the method is not limited to this one. For example, the continuous-use-of-destination enabling unit 134 may enable continuous use of a destination specified last. In such a case, every time, a destination is added, the second display control unit 111 supplies the continuous-use-of-destination enabling unit 134 with the added destination. In addition, upon accepting an operation for switching the screen, the screen-switching-operation accepting unit 131 notifies the continuous-use-of-destination enabling unit 134 of acceptance of the operation.

Upon receipt of this notification, the continuous-use-of-destination enabling unit 134 specifies the destination supplied last from the second display control unit 111 as the destination specified last, supplies the first display control unit 101 with the destination and instructs the first display control unit 101 to display the destination display screen including the destination. In this way, the continuous-use-of-destination enabling unit 134 enables continuous use of the destination specified last.

The continuous-use-of-destination enabling unit 134 may enable continuous use of the destination specified first. In this case, the continuous-use-of-destination enabling unit 134 may specify the destination supplied first from the second display control unit 111 as the destination specified first and issue an instruction. The possibility of the destination specified first or last by the user being a destination weightier than the other destinations is relatively high. In this modification, aspects of non-limiting embodiments of the above disclosure may effect such that a destination likely to be weightier than the other destinations is continuously used.

2-6. Second Continuously-Used-Destination Determination Method

In addition to the modification described above, the continuously used destination may be determined in accordance with a frequency with which information is sent to each destination, for example.

Figure 20:
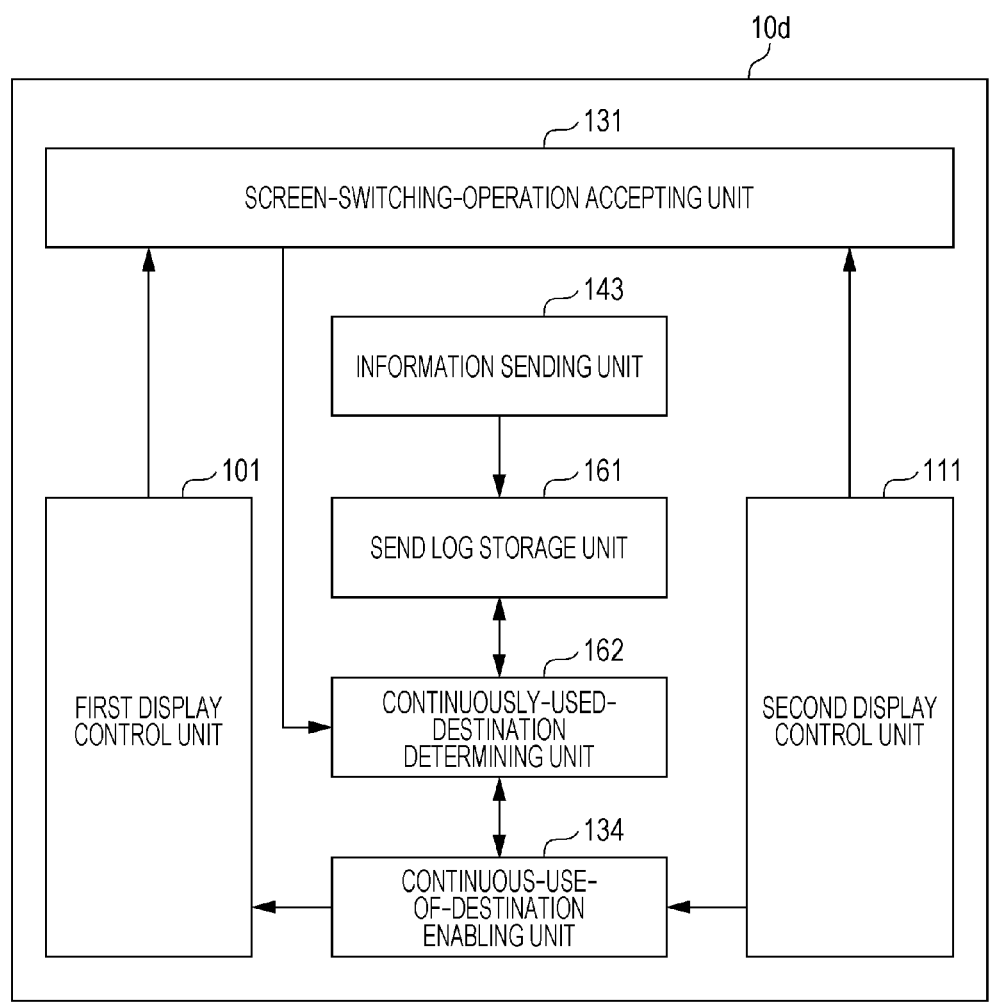
FIG. 20 illustrates a functional configuration implemented by an image processing apparatus according to a modification.

FIG. 20 illustrates a functional configuration implemented by an image processing apparatus 10d according to a modification. The image processing apparatus 10d includes the first display control unit 101, the second display control unit 111, the screen-switching-operation accepting unit 131, the continuous-use-of-destination enabling unit 134, the information sending unit 143, a send log storage unit 161, and a continuously-used-destination determining unit 162.

Upon sending information to a specified destination, the information sending unit 143 supplies the destination to the send log storage unit 161. The send log storage unit 161 stores a send log of each destination specified in the destination display screens A2 and A6. The send log storage unit 161 is an example of a "log storage unit" according to an aspect of the present invention. The send log storage unit 161 stores, as a send log, the destination supplied from the information sending unit 143 and the time at which the destination has been supplied, for example.

Upon accepting an operation for switching the destination display screen, the screen-switching-operation accepting unit 131 notifies the continuously-used-destination determining unit 162 of acceptance of the operation. Upon receipt of this notification, the continuously-used-destination determining unit 162 determines the continuously used destination on the basis of the send log stored in the send log storage unit 161. The continuously-used-destination determining unit 162 determines the continuously used destination in accordance with send frequencies of the individual destinations indicated by the send log.

In such a case, the continuously-used-destination determining unit 162 reads the send log stored in the send log storage unit 161 and calculates, for each destination, a send frequency from the read send log. The continuously-used-destination determining unit 162 determines one or more destinations for which the calculated send frequency is greater than or equal to a threshold as the continuously used destinations, for example. The continuously-used-destination determining unit 162 supplies the determined continuously used destinations to the continuous-use-of-destination enabling unit 134. The continuous-use-of-destination enabling unit 134 instructs the display control unit (the first display control unit 101 or the second display control unit 111) to display the corresponding destination display screen including the supplied destination(s).

The continuous-use-of-destination enabling unit 134 enables continuous use of one or more destinations that are determined in accordance with send frequencies indicated by the stored send log. Note that the continuous-use-of-destination enabling unit 134 may enable, for example, continuous use of a predetermined number of destinations in the descending order of the send frequency in addition to continuous use of one or more destinations for which the send frequency is greater than or equal to a threshold as described above. In either case, since a possibility of a destination with a high send frequency being set as a destination the next time is high, the destination continuously used is more effectively utilized. In addition, there is no need to specify the frequently used destinations. Consequently, aspects of non-limiting embodiments of the above disclosure may effect such that the user's time and effort to specify a destination is likely to be reduced compared with the case where a destination is continuously used regardless of the send frequency.

In addition, the continuous-use-of-destination enabling unit 134 may enable continuous use of a destination for which a send frequency is less than the threshold. As the send frequency of a destination becomes higher, the user may find it less troublesome to specify the destination since the user is familiar with the destination. In contrast, as the send frequency of a destination becomes lower, the user may find it more troublesome to specify the destination since the user is not familiar with the destination (the user may take time to check the fax number or find the destination from the address book, for example). However, such a destination requiring the user's time and effort is continuously used. Thus, aspects of non-limiting embodiments of the above disclosure may effect such that the user's time and effort to specify a destination is likely to be reduced compared with the case where a destination is continuously used regardless of the send frequency.

2-7. Third Continuously-Used-Destination Determination Method

For example, when the second display control unit 111 displays a destination specified through an operation on the numeric keypad image and a destination selected in the address book screen A3 illustrated in FIG. 5 in the destination display screen A6, the continuous-use-of-destination enabling unit 134 may preferentially enable continuous use of the destination specified through the operation on the numeric keypad image over the destination selected in the address book screen A3.

In this case, the second numeric-keypad-operation accepting unit 114 supplies the continuously-used-destination determining unit 162 illustrated in FIG. 20 with numerals specified through accepted operations, that is, the destination specified through operations on the numeric keypad image. The destination-list-operation accepting unit 123 supplies the destination selected by the user, that is, the destination selected in the address book screen A3, to the continuously-used-destination determining unit 162. The continuously-used-destination determining unit 162 determines one of first destinations as the continuously used destination if there are only the first destinations supplied from the destination-list-operation accepting unit 123, for example. However, if there are also second destinations supplied from the second numeric-keypad-operation accepting unit 114, the continuously-used-destination determining unit 162 determines one of the second destinations as the continuously used destination.

An operation for inputting a character string representing a destination using the numeric keypad image is more troublesome than an operation for selecting a destination from an address book. In this modification, continuous use of the destination specified through such a troublesome operation is preferentially enabled. Thus, aspects of non-limiting embodiments of the above disclosure may effect such that the user's time and effort to specify a destination in the destination display screen after switching is likely to be reduced compared with the case where a destination is continuously used regardless of the destination specification method.

2-8. Fourth Continuously-Used-Destination Determination Method

A destination initially displayed (hereinafter, referred to as a default destination) in the destination display screen is sometimes fixed. In such a case, the continuous-use-of-destination enabling unit 134 may enable continuous use of the default destination. That is, the continuous-use-of-destination enabling unit 134 does not enable continuous use of destinations other than the default destination even if the other destinations are specified.

Figure 21:
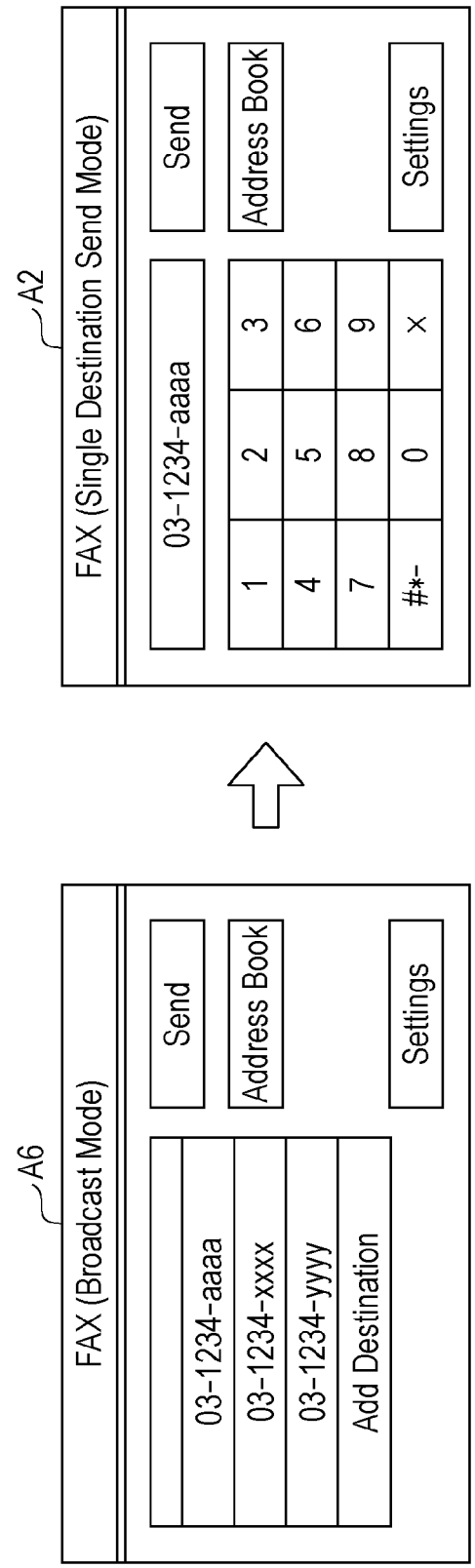
FIG. 21 illustrates an example of a screen transition in accordance with the modification.

FIG. 21 illustrates an example of a screen transition according to a modification. In FIG. 21, a default destination "03-1234-aaaa" and user-specified destinations "03-1234-xxxx" and "03-1234-yyyy" are displayed in the destination display screen A6. In this case, the continuous-use-of-destination enabling unit 134 enables continuous use of the default destination "03-1234-aaaa". As a result, the destination display screen A2 including "03-1234-aaaa" is displayed.

In this modification, when the screen is switched, the default destination is continuously used regardless of the number of destinations specified by the user. Aspects of non-limiting embodiments of the above disclosure may effect such that the destination display screen is displayed in a fixed manner every time the screen is switched, regardless of the state before the switching.

2-9. Deletion of Destination at Screen Switching

The destination need not be continuously used. In such a case, the first display control unit 101 and the second display control unit 111 each display the destination display screen not including any destination displayed in the screen before switching, when the destination display screen for the single destination send mode and the destination display screen for the broadcast mode are switched between.

Figure 22A:
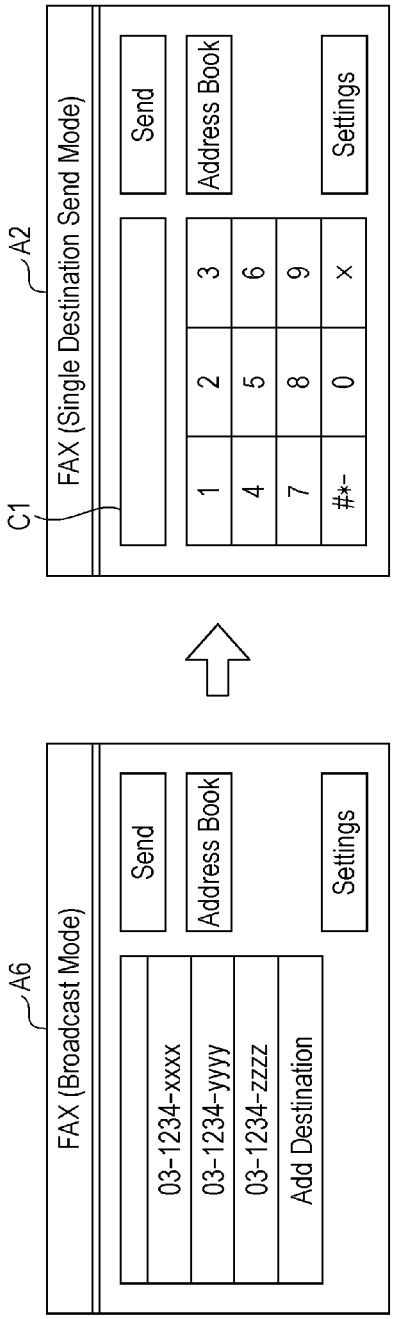
FIGS. 22A and 22B each illustrate an example of a screen transition in accordance with the modification.
Figure 22B:
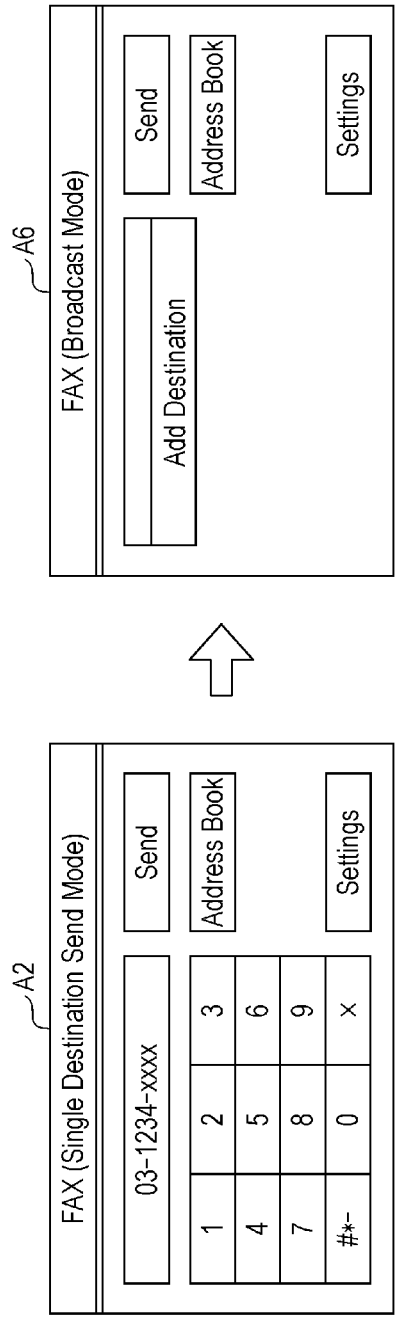

FIGS. 22A and 22B each illustrate an example of a screen transition according to a modification. In FIG. 22A, the destination display screen A6 including three destinations is displayed. When the destination display screen A6 is switched, the destination display screen A2 including no destination at the destination display field C1 is displayed. In FIG. 22B, the destination display screen A2 including a destination "03-1234-xxxx" is displayed. When the destination display screen A2 is switched, the destination display screen A6 including no destination is displayed.

In the case where a destination is continuously used, if the destination is different from a destination to which the user sends information, an operation for deleting the continuously used destination is need. However, in this modification, the destination is not continuously used. Thus, aspects of non-limiting embodiments of the above disclosure may effect such that an operation for deleting a destination in the destination display screen after the switching is not needed when the destination display screen is switched.

2-10. Storage of Destinations

Destinations to which information has been sent may be stored and used later.

Figure 23:
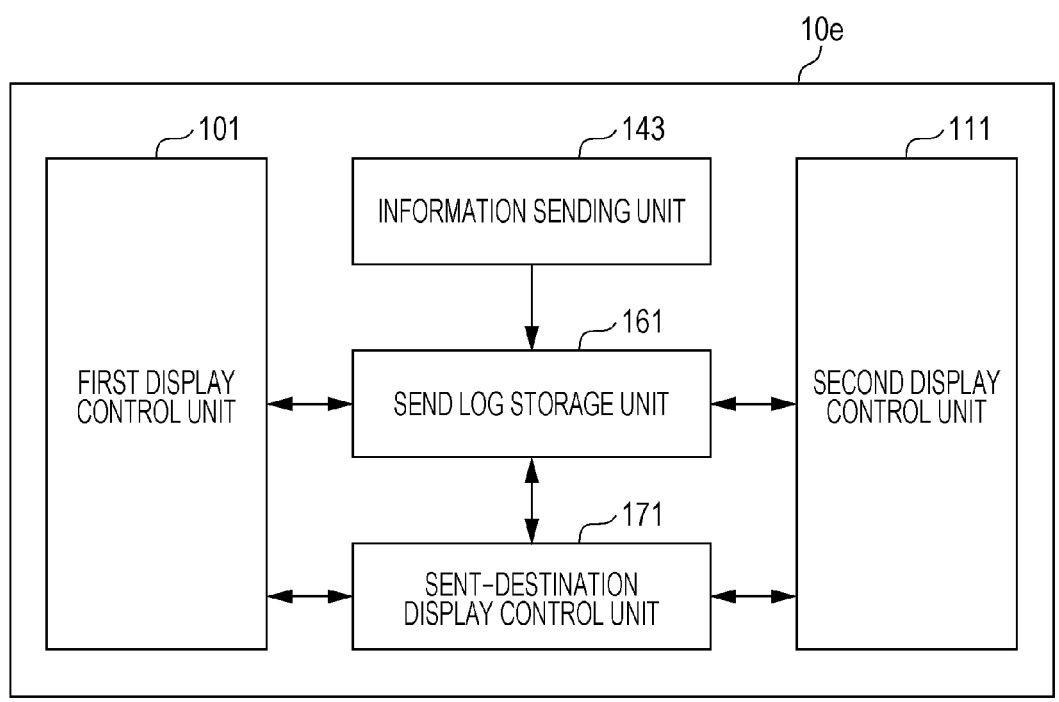
FIG. 23 illustrates a functional configuration implemented by an image processing apparatus according to a modification.

FIG. 23 illustrates a functional configuration implemented by an image processing apparatus 10e according to a modification. The image processing apparatus 10e includes the first display control unit 101, the second display control unit 111, the information sending unit 143, the send log storage unit 161, and a sent-destination display control unit 171.

Upon sending information to a specified destination, the information sending unit 143 supplies the destination to the send log storage unit 161. The send log storage unit 161 stores the destination to which information has been sent by the information sending unit 143. The sent-destination display control unit 171 controls the display to display the destinations stored in the send log storage unit 161. The send log storage unit 161 is an example of a "destination storage unit" according to an aspect of the present invention. The sent-destination display control unit 171 is an example of a "fifth display controller" according to an aspect of the present invention.

Specifically, for example, if destinations displayed in the destination display screen A2 in the past are stored in the send log storage unit 161 when the destination display screen A2 is to be displayed, the sent-destination display control unit 171 performs control such that the destinations is displayed. In addition, if destinations displayed in the destination display screen A6 in the past are stored in the send log storage unit 161 when the destination display screen A6 is to be displayed, the sent-destination display control unit 171 performs control such that the destinations are displayed.

Figure 24A:
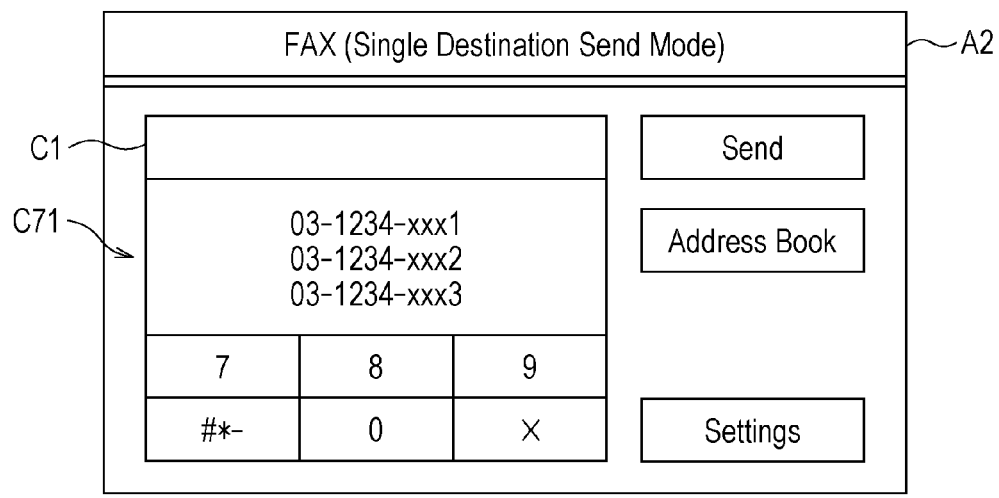
FIGS. 24A and 24B each illustrate an example of a displayed destination display screen.
Figure 24B:
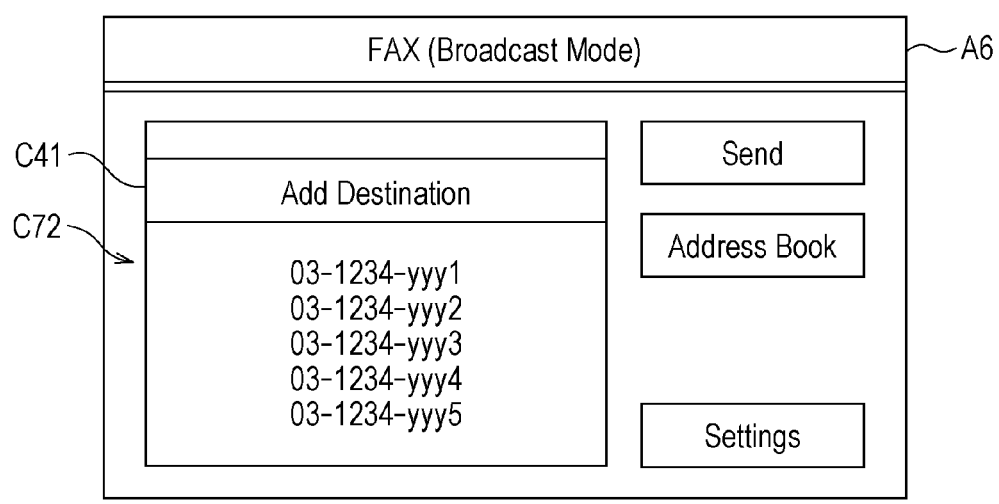

FIGS. 24A and 24B each illustrate an example of a destination display screen displayed in this modification. In FIG. 24A, the first display control unit 101 performs control such that the destination display screen A2 is displayed which includes a sent destination list C71 including three destinations "03-1234-xxx1" to "03-1234-xxx3" under the destination display field C1. These destinations are destinations to which information has been sent in the past in the single destination send mode. In FIG. 24B, the second display control unit 111 performs control such that the destination display screen A6 is displayed which includes a sent destination list C72 including five destinations "03-1234-yyy1" to "03-1234-yyy5", These destinations are destinations to which information has been sent in the past in the broadcast mode.

In this modification, once information is sent to a specified destination, the destination is displayed as a list after the information has been sent. Accordingly, aspects of non-limiting embodiments of the above disclosure may effect to make it easier to specify a destination that has been specified once than to specify a destination that has never been specified.

2-11. Display

In the exemplary embodiment, one apparatus (the image processing apparatus 10) includes display control units (such as the first display control unit 101 and the second display control unit 111) and a display (the operation, panel 18); however, different apparatuses may separately include the display control units and the display. For example, a display may be connected to an information processing apparatus including the display control units, and the display control units may control the display to display the destination display screen or the like.

2-12. Destinations

In the exemplary embodiment, image data is sent using a fax number as the destination; however, the configuration is not limited to this one. For example, an email may be sent using an email address as the destination or a post may be sent using a social networking service (SNS) account as the destination. When these destinations are used, a software keyboard image is used instead of the numeric keypad image as an image for accepting an operation for specifying characters representing a destination.

2-13. Categories of Invention

The present invention may be considered not only as an information processing apparatus that controls displaying of the destination display screen, etc. just like the above-described image processing apparatus but also as an information processing method for implementing a process performed by the information processing apparatus and a program causing a computer to execute the process. This program may be provided in a form of a recording medium, such as an optical disc storing the program or may be provided as a result of downloading and installing the program onto the computer via a communication line such as the Internet to make the program usable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated, It is intended that the scope of the invention be defined by the following claims and their equivalents.

What is claimed is:

1. An information processing apparatus for transmitting data to one or more destinations, comprising:
    a first display controller that causes a first screen to be displayed on a display, the first screen being a screen that shows a specified destination for the transmission of the data and includes a first image for accepting an operation for inputting a character string representing a destination for the data transmission;
    a second display controller that causes a second screen to be displayed, the second screen being a screen that shows the specified destination for the transmission of the data and includes a second image for accepting an operation for inputting the character string representing the destination for the data transmission; and
    a processor functioning as a first switching unit that switches between the first screen and the second screen,
    the processor also functioning as a continuous-use enabling unit that enables, when the first screen and the second screen are switched between a destination shown in one of the first screen and the second screen before switching to be continuously shown in the other of the first screen and the second screen after the switching,
    wherein the first display controller causes a screen including a number of destinations for the data transmission that is less than a predetermined number to be displayed as the first screen, and
    wherein the second display controller causes a screen including a number of destinations for the data transmission that is greater than or equal to the predetermined number to be displayed as the second screen.

2. The information processing apparatus according to claim 1, further comprising:
    a fourth display controller that performs control, when the first screen and the second screen are switched between, such that a fourth screen is displayed on the display, the fourth screen being a screen allowing a user to select any of destinations shown in one of the first screen and the second screen before switching,
    wherein the continuous-use enabling unit enables the destination selected by the user in the fourth screen to be continuously used.

3. The information processing apparatus according to claim 1, wherein the continuous-use enabling unit enables a destination specified first or last to be continuously used.

4. The information processing apparatus according to claim 1, further comprising:
    a log storage unit that stores a send log of destinations specified in the first screen and the second screen, wherein the continuous-use enabling unit enables a destination that is determined from among the destinations in accordance with a send frequency indicated by the stored send log to be continuously used.

5. The information processing apparatus according to claim 1, further comprising:
a third display controller that performs control such that a third screen is displayed on the display, the third screen being a screen allowing a user to select one or more destinations from among a plurality of registered destinations,
wherein the second display controller performs control such that the second screen is displayed, the second screen including a destination specified by an operation on the second image and a destination selected in the third screen, and
wherein the continuous-use enabling unit preferentially enables the destination specified by an operation on the second image to be continuously used over the destination selected in the third screen.

6. The information processing apparatus according to claim 1, wherein the a destination initially shown in the first screen and the second screen is fixed, and
wherein the continuous-use enabling unit enables the destination initially shown to be continuously used.

7. The information processing apparatus according to claim 1, wherein the first display controller performs control such that the first screen is displayed which includes no destination shown in the second screen before switching, when the second screen is switched to the first screen, and
wherein the second display controller performs control such that the second screen is displayed which includes no destination shown in the first screen before switching, when the first screen is switched to the second screen.

8. The information processing apparatus according to claim 1, further comprising:
a destination storage unit that stores a destination to which information has been sent; and
a fifth display controller that performs control, in a case where the destination storage unit stores a destination shown in the first screen in the past, such that the destination is shown when the first screen is displayed and that performs control, in a case where the destination storage unit stores a destination shown in the second screen in the past, such that the destination is shown when the second screen is displayed.

9. An information processing apparatus for transmitting data to one or more destinations, comprising:
a first display controller that causes a first screen to be displayed on a display, the first screen being a screen that shows a specified destination for the transmission of the data and includes a first image for accepting an operation for inputting a character string representing a destination for the data transmission;
a second display controller that causes a second screen to be displayed, the second screen being a screen that shows the specified destination for the transmission of the data and includes a second image for accepting an operation for inputting the character string representing the destination for the data transmission;
a processor functioning as a first switching unit that switches between the first screen and the second screen; and
a third display controller that causes a third screen to be displayed on the display, the third screen being a screen allowing a user to select one or more destinations for the data transmission from among a plurality of registered destinations for the data transmission,
the processor also functioning as a second switching unit that switches the third screen to the first screen upon a number of destinations for the data transmission that is less than a predetermined number being selected in the third screen and switches the third screen to the second screen upon a number of destinations for the data transmission that is greater than or equal to the predetermined number being selected in the third screen,
wherein the first display controller causes a screen including a number of destinations for the data transmission that is less than the predetermined number to be displayed as the first screen, and
wherein the second display controller causes a screen including a number of destinations for the data transmission that is greater than or equal to the predetermined number to be displayed as the second screen.

10. The information processing apparatus according to claim 9, wherein the first display controller causes the first screen to be displayed which includes no destination shown in the second screen before switching, when the second screen is switched to the first screen, and
wherein the second display controller causes the second screen to be displayed which includes no destination shown in the first screen before switching, when the first screen is switched to the second screen.

11. The information processing apparatus according to claim 9, further comprising:
a destination storage unit that stores a destination to which information has been sent; and
a fifth display controller that causes, in a case where the destination storage unit stores a destination shown in the first screen in the past, the destination to be shown when the first screen is displayed and that causes, in a case where the destination storage unit stores a destination shown in the second screen in the past, the destination to be shown when the second screen is displayed.

12. An information processing apparatus for transmitting data to one or more destinations, comprising:
a first display controller that causes a first screen to be displayed on a display, the first screen being a screen that shows a specified destination for the transmission of the data and includes a first image for accepting an operation for inputting a character string representing a destination for the data transmission;
a second display controller that causes a second screen to be displayed, the second screen being a screen that shows the specified destination for the transmission of the data and includes a second image for accepting an operation for inputting the character string representing the destination for the data transmission; and
a processor functioning as a first switching unit that switches between the first screen and the second screen,
the processor also functioning as an accepting unit that accepts an operation for deleting a destination shown in the second screen,
the processor further functioning as a third switching unit that switches the second screen to the first screen upon the number of destinations shown in the second screen becoming less than a predetermined number from a number greater than or equal to the predetermined number as a result of the operation accepted by the accepting unit,
wherein the first display controller causes a screen including a number of destinations for the data transmission that is less than the predetermined number to be displayed as the first screen, and wherein the second display controller causes a screen including a number of destinations for the data transmission that is greater than or equal to the predetermined number to be displayed as the second screen.

13. The information processing apparatus according to claim 12, wherein the first display controller causes the first screen to be displayed which includes no destination shown in the second screen before switching, when the second screen is switched to the first screen, and wherein the second display controller causes the second screen to be displayed which includes no destination shown in the first screen before switching, when the first screen is switched to the second screen.

14. The information processing apparatus according to claim 12, further comprising:

a destination storage unit that stores a destination to which information has been sent; and a fifth display controller that causes, in a case where the destination storage unit stores a destination shown in the first screen in the past, the destination to be shown when the first screen is displayed and that causes, in a case where the destination storage unit stores a destination shown in the second screen in the past, the destination to be shown when the second screen is displayed.

* * * * *